(12) United States Patent
Kato et al.

(10) Patent No.: US 8,695,406 B2
(45) Date of Patent: Apr. 15, 2014

(54) SAFETY DEVICE AND PREPARATORY MOVEMENT DETERMINATION METHOD

(75) Inventors: Yumiko Kato, Osaka (JP); Jun Ozawa, Nara (JP)

(73) Assignee: Panasonic Corporation, Osaka (JP)

(*) Notice: Subject to any disclaimer, the term of this patent is extended or adjusted under 35 U.S.C. 154(b) by 2 days.

(21) Appl. No.: 13/536,237

(22) Filed: Jun. 28, 2012

(65) Prior Publication Data
US 2012/0279285 A1  Nov. 8, 2012

Related U.S. Application Data

(63) Continuation of application No. PCT/JP2011/006443, filed on Nov. 18, 2011.

(30) Foreign Application Priority Data

Jan. 17, 2011  (JP) .................................. 2011-007349

(51) Int. Cl.
*G01M 1/00* (2006.01)

(52) U.S. Cl.
USPC ........................................ 73/65.01; 73/865.4

(58) Field of Classification Search
USPC ....................................... 73/65.01, 172, 865.4
See application file for complete search history.

(56) References Cited

U.S. PATENT DOCUMENTS

| 6,778,092 | B2 | 8/2004 | Braune |
| 7,086,262 | B2 | 8/2006 | Suzuki et al. |
| 8,011,229 | B2 * | 9/2011 | Lieberman et al. .......... 73/65.01 |
| 2003/0076224 | A1 | 4/2003 | Braune |
| 2005/0081587 | A1 | 4/2005 | Suzuki et al. |
| 2009/0137933 | A1 * | 5/2009 | Lieberman et al. ........... 600/595 |
| 2011/0109257 | A1 | 5/2011 | Someya |
| 2011/0178680 | A1 | 7/2011 | Kato et al. |

FOREIGN PATENT DOCUMENTS

| JP | 61-206002 | 9/1986 |
| JP | 5-337700 | 12/1993 |
| JP | 6-9698 | 3/1994 |
| JP | 2003-222295 | 8/2003 |
| JP | 2005-125330 | 5/2005 |
| JP | 2005-250990 | 9/2005 |
| JP | 2007-289319 | 11/2007 |
| JP | 2007-330336 | 12/2007 |
| JP | 2009-160622 | 7/2009 |
| JP | 4740399 | 8/2011 |

OTHER PUBLICATIONS

Iwao Matsuda et al., "Mechanism of Movement Reaction (Shin-ban Undou Shinri-gaku Nyumon)", Taishukan Shoten, Mar. 1987, Chapter 2, pp. 15-22, with partial English translation.

* cited by examiner

*Primary Examiner* — Lisa Caputo
*Assistant Examiner* — Roger Hernandez-Prewitt
(74) *Attorney, Agent, or Firm* — Wenderoth, Lind & Ponack, L.L.P.

(57) ABSTRACT

A safety device for a machine having an action part for processing or moving an object includes: a posture obtainment unit configured to obtain a plurality of posture data indicating a posture of at least part of the lower body of a worker; and a preparatory movement determination unit configured to determine that a preparatory movement preceding a dangerous movement which brings at least part of the upper body of the worker closer to a working area of the action part is being performed in the case where a change in the posture indicated by the plurality of posture data shows that the worker is shifting a center of gravity of whole body of the worker in an orientation away from the working area of the action part without changing positions of both feet.

13 Claims, 21 Drawing Sheets

FIG. 8

| ID | X-axis direction distance (Px) | Y-axis direction distance (Py) | Pressure value (Kg/cm²) (Wxy) |
|---|---|---|---|
| P11 | 80 | 40 | 0 |
| P12 | 120 | 40 | 0 |
| P13 | 160 | 40 | 0 |
| ... | ... | ... | ... |
| P65 | 240 | 260 | 0.3 |
| ... | ... | ... | ... |
| ... | ... | ... | ... |
| ... | ... | ... | ... |
| P89 | 280 | 320 | 0 |

FIG. 9

| Preparatory movement ID | Distance from machine press to foot soles (mm) | Center-of-gravity moving speed X direction (mm/s) | Dangerous area entry prediction relative time (ms) | Entry portion |
|---|---|---|---|---|
| 001 | 500 ~ 800 | -10 ~ -5 | 500 | Upper body |
| ⋮ | ⋮ | ⋮ | ⋮ | ⋮ |
| ⋮ | ⋮ | ⋮ | ⋮ | ⋮ |
| ⋮ | ⋮ | ⋮ | ⋮ | ⋮ |

| Preparatory movement ID | Distance from machine press to foot soles (mm) | Body orientation | Center-of-gravity moving speed X direction (mm/s) | Dangerous area entry prediction relative time (ms) | Entry portion |
|---|---|---|---|---|---|
| 001 | 500 - 800 | -0.26 - 0.26 | -10 - -5 | 500 | Upper body |
| 002 | 800 - 1200 | -0.22 - 0.22 | -14 - -8 | 700 | Upper body |
| ⋮ | ⋮ | ⋮ | ⋮ | ⋮ | ⋮ |
| ⋮ | ⋮ | ⋮ | ⋮ | ⋮ | ⋮ |

202a

SAFETY DEVICE AND PREPARATORY MOVEMENT DETERMINATION METHOD

CROSS REFERENCE TO RELATED APPLICATIONS

This is a continuation application of PCT Patent Application No. PCT/JP2011/006443 filed on Nov. 18, 2011, designating the United States of America, which is based on and claims priority of Japanese Patent Application No. 2011-007349 filed on Jan. 17, 2011. The entire disclosures of the above-identified applications, including the specifications, drawings and claims are incorporated herein by reference in their entirety.

TECHNICAL FIELD

Devices and methods consistent with one or more exemplary embodiments of the present disclosure relate generally to a safety device and a preparatory movement determination method of preventing an accident in which a worker's body is caught in an action part during operation of a machine having the action part, or the like.

BACKGROUND ART

There is a growing need for a machine press which presses a work object to operate safely. For example, there is a growing need for a technique to stop operation of the machine press when it detects that part of a worker's body has entered an area in which an action part of the machine press operates (dangerous area).

FIGS. 1A and 1B each show an example of an action part of an electrical machine press according to Patent Literature 1. FIG. 1A is an elevation view of the action part of the electrical machine press. Moreover, FIG. 1B is a left side view of the action part of the electrical machine press.

An upper mold 7 is mounted under an upper slide 3, while a lower mold 9 is mounted on a lower slide 5. Hereafter, the upper slide 3 and the lower slide 5 are referred to as the upper and lower slides or only the slides. A work object W is disposed between the upper mold 7 and the lower mold 9. Then, a distance between the upper mold 7 and the lower mold 9 is decreased. As a result, pressure is applied to the work object W and the work object W is processed. The upper slide 3, the lower slide 5, the upper mold 7, and the lower mold 9 are components for processing the work object W, all of which correspond to the action part.

For example, the worker causes a hand to enter between the upper and lower slides from a front plane in FIG. 1A, that is, from a right side in FIG. 1B in order to replace the work object or determine a position of the work object. A region in which a hand is likely to be caught (dangerous area) is a position sandwiched between the upper mold 7 and the lower mold 9.

In a conventional machine press, a worker prevents a hand from being caught in the machine through manually cutting off power when a work for replacing the work object or determining the position of the work object is performed. Moreover, a machine press according to Patent Literature 2 prevents a hand of a worker from being caught, in the machine by automatically cutting off power based on detection by an entry detection sensor, an area sensor, or the like that part or the whole of the worker's body has entered a dangerous area.

CITATION LIST

Patent Literature

Patent Literature 1: Japanese Examined Utility Model Application Publication No. 6-9698
Patent Literature 2: Japanese Unexamined Patent Application Publication No. 2005-125330

SUMMARY OF INVENTION

Technical Problem

However, the above described conventional techniques have difficulties in preventing a decrease in working efficiency and ensuring an increase in safety.

Therefore, the present disclosure relates to a safety device provided with an aim to prevent a decrease in working efficiency and ensure an increase in safety.

Solution to Problem

In order to achieve the object, a safety device according to an aspect of the present disclosure is a safety device for a machine having an action part for processing or moving an object, including: a posture obtainment unit configured to obtain a plurality of posture data indicating a posture of at least a part of a lower body of a worker; and a preparatory movement determination unit configured to determine that a preparatory movement preceding a dangerous movement is being performed in the case where a change in the posture indicated by the plurality of posture data shows that the worker is shifting a center of gravity of whole body in an orientation away from a working area of the action part without changing positions of both feet, the dangerous movement being a movement of at least a part of an upper body of the worker approaching the working area of the action part.

It should be noted that these overall and specific aspects may be implemented as a system, a method, an integrated circuit, a computer program, or a recording medium, and as an optional combination of a system, a method, an integrated circuit, a computer program, and a recording medium.

Advantageous Effects of Invention

Exemplary devices and methods in the present disclosure and their equivalents within the scope of the inventive concept defined in the attached claims make it possible to provide a safety device which can prevent a decrease in working efficiency and ensure an increase in safety.

BRIEF DESCRIPTION OF DRAWINGS

These and other advantages and features of exemplary embodiments of the present disclosure will become apparent from the following description thereof taken in conjunction with the accompanying Drawings that illustrate general and specific exemplary embodiments of the present disclosure. In the Drawings:

FIG. 8 is a diagram showing an example of a pressure value measured by the pressure sensor sheet according to Embodiment 1;

FIG. 9 is a diagram showing an example of a preparatory movement definition table according to Embodiment 1;

FIG. 16 is a diagram showing an example of a preparatory movement definition table according to Embodiment 2;

DESCRIPTION OF EMBODIMENTS

Underlying Knowledge Forming Basis of the Present Disclosure

The inventors found that the following problems occur in the detection of an entry into a dangerous area as described in the Background Art.

Figure 1A:
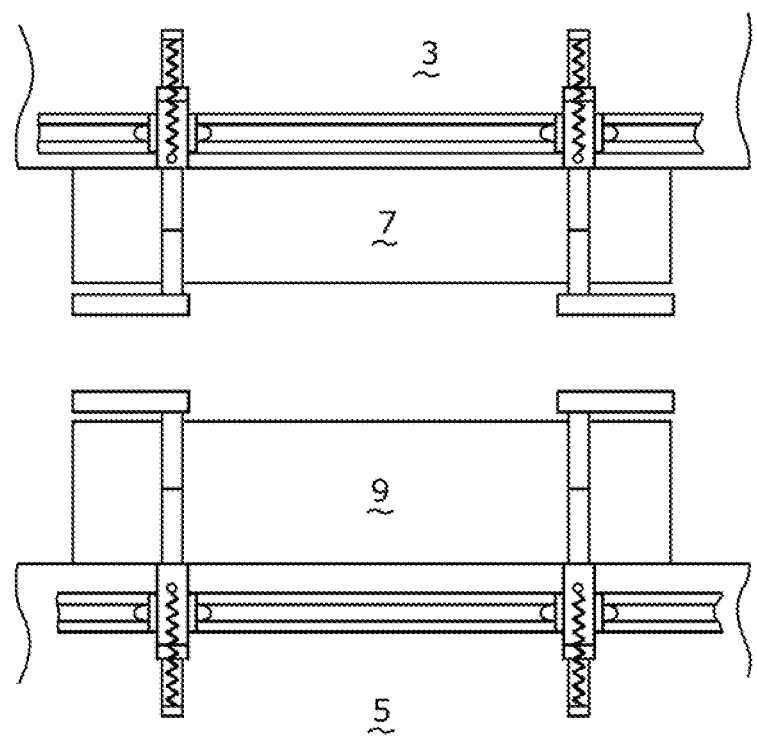
FIG. 1A is an elevation view of an action part of a conventional machine press.
Figure 1B:
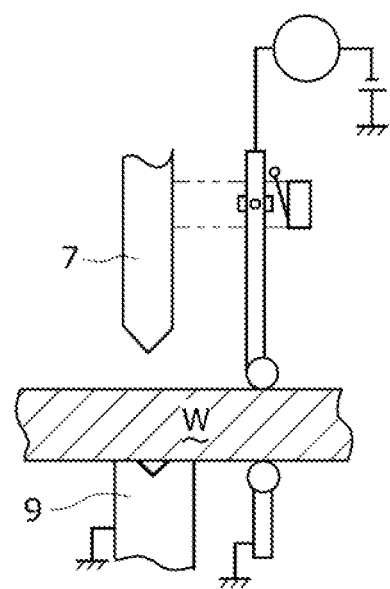
FIG. 1B is a left side view of the action part of the conventional machine press.

As an entry detection sensor for detecting an entry into a dangerous area, for example, a beam sensor using an infrared ray or the like is used. The entry detection sensor is, for example, is installed just before a dangerous area (a movable area of the slides of FIG. 1, for example). The machine press prevents a worker's body from being caught between molds by stopping the slides on the detection that the body passes through the position of the entry detection sensor.

In the case where the entry detection sensor is installed on a borderline of the dangerous area, the time is short between when the worker's body passes through the installation position of the entry detection sensor and when the worker's body reaches the dangerous area, with a result that the suspension of the slides is too late. Therefore, the entry detection sensor is installed at a position a predetermined distance away from the dangerous area. Specifically, the entry detection sensor is installed at a position farther away from the dangerous area than a distance covered by the body between when the entry detection sensor detects the passage of the body at the installment position of the entry detection sensor and when the slides of the machine press make a full stop. With this, in the case where the worker moves fast or in the case where long time is needed for the action part to make a full stop, the worker's body can be prevented from being caught in the action part.

However, the entry detection sensor must be installed at a position a predetermined distance away from the dangerous area. Especially, in the case where necessary time to fully stop the slides in operation is long or in the case where the worker's body movement is fast, the entry detection sensor must be installed at a position a large distance away from the dangerous area.

In this case, the possibility is high that even if the worker's body passes through the position of the entry detection sensor, the body will not enter the dangerous area. In other words, there has been a problem that the possibility is high that the slides are erroneously stopped with a result that working efficiency is decreased.

In order to achieve the object, a safety device according to an aspect of the present disclosure is a safety device for a machine having an action part for processing or moving an object, including: a posture obtainment unit configured to obtain a plurality of posture data indicating a posture of at least a part of a lower body of a worker; and a preparatory movement determination unit configured to determine that a preparatory movement preceding a dangerous movement is being performed in the case where a change in the posture indicated by the plurality of posture data shows that the worker is shifting a center of gravity of whole body of the worker in an orientation away from a working area of the action part without changing positions of both feet, the dangerous movement being a movement of at least a part of an upper body of the worker approaching the working area of the action part.

With this configuration, it can be determined that a preparatory movement is being performed which precedes a dangerous movement of the upper body of the worker approaching the working area of the action part, by using a change in the posture of the lower body of the worker. The preparatory movement is a movement unintentionally performed by a person before the person performs a conscious movement. In other words, the worker unintentionally performs the preparatory movement before a dangerous movement that is a conscious movement. Therefore, by determining that the preparatory movement is being performed, it is possible to detect with high accuracy that the dangerous movement is performed before the dangerous movement is performed. As a result, the present disclosure can prevent a decrease in working efficiency and ensure an increase in safety.

For example, the plurality of posture data may include a pressure distribution of soles of feet of the worker, and the preparatory movement determination unit may be configured to determine that the preparatory movement is being performed in the case where a position specified by the pressure distribution is moving in an orientation away from the working area of the action part.

With this configuration, it can be determined whether or not the preparatory movement is being performed, by using the position specified by the pressure distribution of the soles of feet of the worker. In other words, it is possible to detect that the worker is shifting the center of gravity of whole body of the worker in an orientation away from the working area of the action part, by using the shift of the position specified by the pressure distribution of the soles of feet of the worker. Therefore, it is possible to determine with relative ease that the preparatory movement preceding the dangerous movement is being performed.

For example, the position specified by the pressure distribution may be a center-of-gravity position of the pressure distribution.

With this configuration, it can be determined whether or not the preparatory movement is being performed, by using the center-of-gravity position of the pressure distribution of the soles of feet of the worker. The preparatory movement is a movement for controlling a posture and therefore is accompanied by a shift of the center of gravity of whole body of the worker. Therefore, it is possible to determine with higher accuracy that the preparatory movement preceding the dangerous movement is being performed by using the center-of-gravity position of the pressure distribution of the soles of feet of the worker.

For example, the preparatory movement determination unit may be configured to determine that the preparatory movement is being performed in the case where the center-of-gravity position is shifting in the orientation away from the working area of the action part and a moving speed, a moving time, or a moving distance of the center-of-gravity position in the orientation away from the working area of the action part is greater than or equal to a first threshold value.

With this configuration, it can be determined that the preparatory movement is being performed in the case where a moving speed, a moving time, or a moving distance of the center-of-gravity position in an orientation away from the working area of the action part is greater than or equal to the first threshold value. In other words, it is possible to prevent an erroneous determination of the preparatory movement in the case where the shift of the center-of-gravity position in an orientation away from the working area of the action part is a small shift different from the shift caused by the preparatory movement. Therefore, it is possible to determine with higher accuracy that the preparatory movement preceding the dangerous movement is being performed.

For example, the preparatory movement determination unit may be configured to determine that the preparatory movement is being performed in the case where the center-of-gravity position is shifting in an orientation away from the working area of the action part and a moving speed, a moving time, or a moving distance of the center-of-gravity position in the orientation away from the working area of the action part is from greater than or equal to the first threshold value to less than a second threshold value.

With this configuration, it can be determined that the preparatory movement is being performed in the case where a moving speed, a moving time, or a moving distance of the center-of-gravity position in an orientation away from the working area of the action part is less than the second threshold value. In other words, it is possible to prevent an erroneous determination of the preparatory movement in the case where the shift of the center-of-gravity position in an orientation away from the working area of the action part is a large shift different from the shift caused by the preparatory movement. Therefore, it is possible to determine with higher accuracy that the preparatory movement preceding the dangerous movement is being performed.

For example, the safety device may further include a distance detection unit configured to detect a distance between the working area of the action part and the worker, wherein the preparatory movement determination unit may be configured to determine that the preparatory movement is being performed in the case where the center-of-gravity position is shifting in an orientation away from the working area of the action part and the distance is less than a third threshold value.

With this configuration, it can be determined that the preparatory movement is being performed in the case where a distance between the working area of the action part and the worker is less than the third threshold value. In other words, since the possibility is low that the worker's body enters the working area of the action part in the case where the worker is at a position away from the working area of the action part, it can be determined that the preparatory movement preceding the dangerous movements is not being performed. To put it another way, in the case where the possibility is low that the worker is injured, it is possible to prevent the acting part from being stopped or slowed down and to enhance workability.

For example, the safety device may further include a size detection unit configured to detect a size of at least a part of the body of the worker; and a correction unit configured to correct the detected distance such that when the size of the at least a part of the body of the worker is larger, the distance is shorter, wherein the preparatory movement determination unit may be configured to determine that the preparatory movement is being performed in the case where the center-of-gravity position is shifting in the orientation away from the working area of the action part and the corrected distance is less than the third threshold value.

With this configuration, it is possible to correct a distance between the working area of the action part and the worker such that when a size of at least part of the body is larger, the distance is shorter. The possibility is higher that the body enters the working area of the action part when the body size of the worker is larger, even in the case where the worker is at a position away from the working area of the action part. Therefore, it is possible to determine with higher accuracy that the preparatory movement preceding the dangerous movement is being performed by determining whether or not the preparatory movement preceding the dangerous movement is being performed with the use of a distance corrected according to the body size of the worker.

For example, The safety device may further include an orientation detection unit configured to detect a body orientation of the worker, wherein the preparatory movement determination unit may be configured to determine that the preparatory movement is being performed in the case where the center-of-gravity position is shifting in an orientation away from the working area of the action part and an angle formed between the body orientation of the worker and an orientation of the working area of the action part seen from the worker is within a predetermined range.

With this configuration, it can be determined whether or not the preparatory movement is being performed with the use of the body orientation of the worker. The possibility is high that the body enters the working area of the action part when the orientation of the worker is facing the front face of the machine. Therefore, it is possible to determine with higher accuracy that the preparatory movement preceding the dangerous movement is being performed.

For example, the safety device may further comprise a preparatory movement definition storage unit configured to store a first threshold value, wherein the preparatory movement determination unit may be configured to determine that the preparatory movement is being performed in the case where the center-of-gravity position is shifting in an orientation away from the working area of the action part, and a moving speed, a moving time, or a moving distance of the center-of-gravity position in the orientation away from the working area of the action part is greater than or equal to the stored first threshold value.

For example, the safety device may further include a distance detection unit configured to detect the distance between the working area of the action part and the worker, wherein the preparatory movement definition storage unit may be configured to store a plurality of first threshold values including the first threshold value in association with distances between the working area of the action part and the worker, and the preparatory movement determination unit is configured to (i) specify a first threshold value corresponding to the detected distance among the plurality of the first threshold values stored in the preparatory movement definition storage unit and (ii) determine that the preparatory movement is being performed in the case where the center-of-gravity position is shifting in an orientation away from the working area of the action part, and a moving speed, a moving time, or a moving distance of the center-of-gravity position in the orientation away from the working area of the action part is greater than or equal to the specified first threshold value.

With this configuration, it can be determined whether or not the preparatory movement is being performed with the use of the first threshold value corresponding to the detected distance. The shift of the center-of-gravity position in an orientation away from the working area of the action part caused by the preparatory movement varies depending on the distance between the working area of the action part and the worker. For example, a moving distance of the center-of-gravity position is longer because the dangerous movement is larger when the distance between the working area of the action part and the worker is longer. Therefore, it is possible to determine with higher accuracy that the preparatory movement preceding the dangerous movement is being performed by determining whether or not the preparatory movement is being performed with the use of the first threshold value corresponding to the detected distance.

For example, the safety device may further include: a size detection unit configured to detect a size of the soles of feet of the worker based on the pressure distribution; and a correction unit configured to correct the detected distance such that when the size of the soles of feet of the worker is larger, the distance is shorter, wherein the preparatory movement determination unit may be configured to specify the first threshold value corresponding to the corrected distance among the plurality of the first threshold values.

With this configuration, it is possible to correct a distance between the working area of the action part and the worker such that when a size of at least part of the body is larger, the distance is shorter. The possibility is higher that the body enters the working area of the action part when the body size of the worker is larger, even in the case where the worker is at a position away from the working area of the action part. Therefore, it is possible to determine with higher accuracy that the preparatory movement preceding the dangerous movement is being performed by determining whether or not the preparatory movement preceding the dangerous movement is being performed with the use of the distance corrected according to the body size of the worker.

For example, the posture obtainment unit may be configured to obtain, from a pressure sensor installed on a floor surface, the plurality of posture data including the pressure distribution of the soles of feet of the worker.

With this configuration, the pressure distribution of the soles of feet of the worker can be measured with the use of the pressure sensor installed on the floor surface.

For example, the safety device may further include a safety operation control unit configured to slow down or stop the action part in the case where it is determined that the preparatory movement is being performed.

With this configuration, in the case where it is determined that the preparatory movement is being performed, the acting part can be stopped or be slowed down. Therefore, it is possible with more certainty to prevent the worker from being injured.

It should be noted that these overall and specific aspects may be implemented as a system, a method, an integrated circuit, a computer program, a recording medium such as Compact Disk Read Only Memory (CD-ROM), or the like, and as an optional combination of a system, a method, an integrated circuit, a computer program, or a recording medium.

Hereafter, embodiments of the present disclosure will be described in detail with reference to the drawings. It should be noted that all the embodiments to be described later are specific examples of the present disclosure. In other words, the numerical values, shapes, materials, structural elements, the arrangement and connection of the structural elements, steps, the processing order of the steps etc. shown in the following exemplary embodiments are mere examples, and therefore do not limit the inventive concept, the scope of which is defined in the appended Claims and their equivalents. Therefore, among the structural elements in the following exemplary embodiments, structural elements not recited in any one of the independent claims defining the most generic part of the inventive concept are not necessarily required to overcome conventional disadvantages.

First, the terms of the body parts will be described with reference to FIG. 2.

Figure 2:
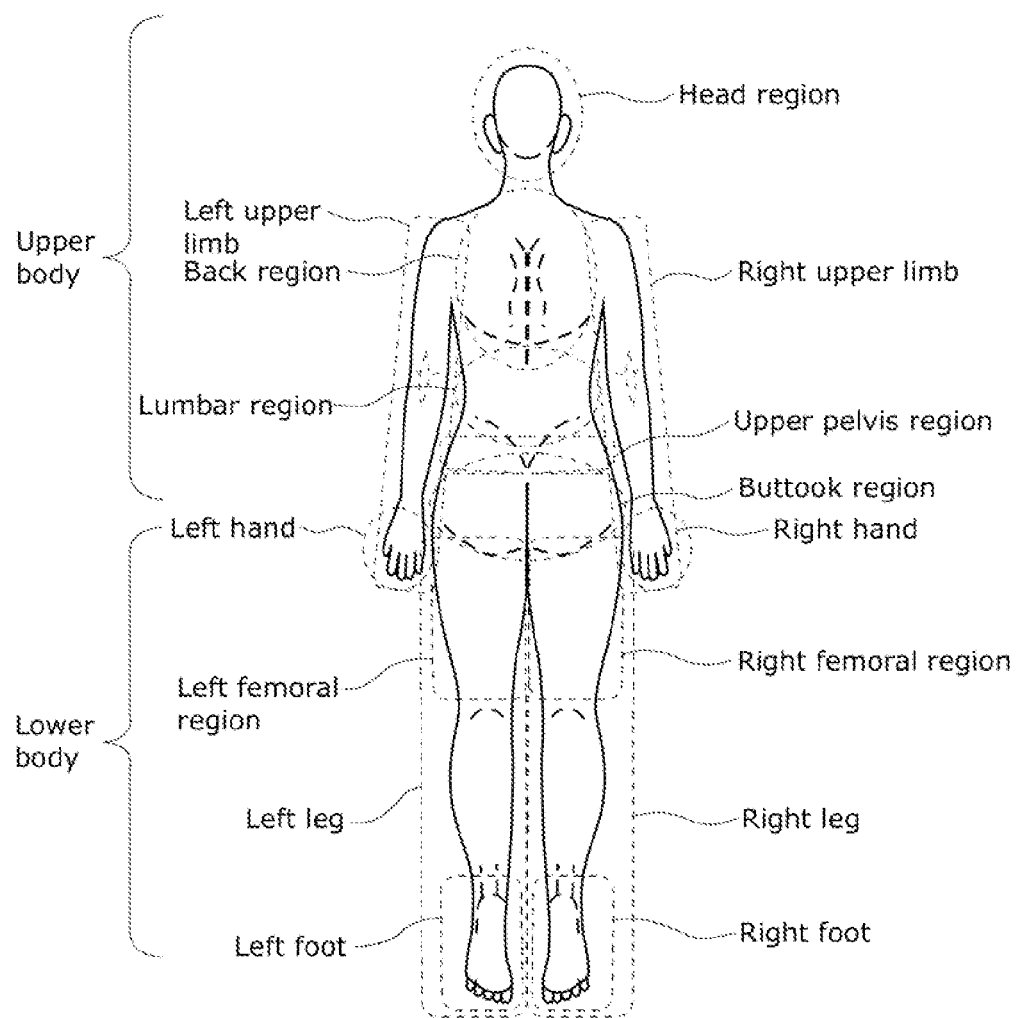
FIG. 2 is a diagram for explaining terms for body parts.

FIG. 2 is a diagram showing a human body seen from the back surface. As shown in FIG. 2, the human body is divided into the upper body and the lower body. The upper body includes the head region, the cervical region, the back region, the buttock region, and the left and right upper limbs.

The head region is a region supported by the skull and the mandible, and includes the head and the face. Moreover, the head region includes a region which includes all parts of the face such as eyes, ears, a nose, a mouth, and the like. The cervical region is a portion of the neck. The cervical region includes the first to the seventh vertebrae and the peripheral region and is a region from the shoulder to the head region. The back region is a dorsal region occupying the upper part of the back surface of the trunk and is a region supported by rib bones. The lumbar region is a region which is located in the lower part of the back region of the lower part of the back surface of the trunk, and is a region from the ribs to the pelvis. The left and right upper limbs include left and right arms and hands.

The lower body is a region lower than the lumbar region and includes left and right legs.

The left and right legs are parts lower than the hip joints. Each of the left and right legs includes a femoral region and a leg. The femoral region is a thigh. In other words, the femoral region is a part higher than the knee of the leg. The foot region is a part lower than the ankle.

Next, description about the preparatory movement will be made with reference to FIG. 3.

The preparatory movement refers to an anticipatory postural control. Specifically, the preparatory movement is defined as the movement of the body as the posture of a person is controlled before a motion of the person when the person tries to make the motion.

For example, in the case where a person stands on both legs and lifts the right leg, the person shifts the center of gravity of whole body to the left leg before lifting the right leg so that the person does not fall even when the right foot is lifted. When such a motion is made, the postural control which is done anticipatorily before the motion in order to maintain the balance of the person's body is called the preparatory movement.

Such a preparatory movement is unintentionally performed. The preparatory movement is made several hundreds milliseconds before the actual motion though depending on the body part to be used for the motion or the scale of the motion (For example, refer to Reference Literature 1 (Atsushi Fujita, "Undou Shihai no Seiri Shinri: Undou Hannou no Mekanizumu (Physiological Psychology of Exercise Control: Mechanism of Exercise Response)", Chapter 2, p 15-22, "Shin-ban Undou Shinri-gaku Nyumon" (New Edition—Introduction to Exercise Psychology) edited by Iwao Matsuda and Takashi Sugihara, Taishukan Shoten, Tokyo, 1987).

Figure 3:
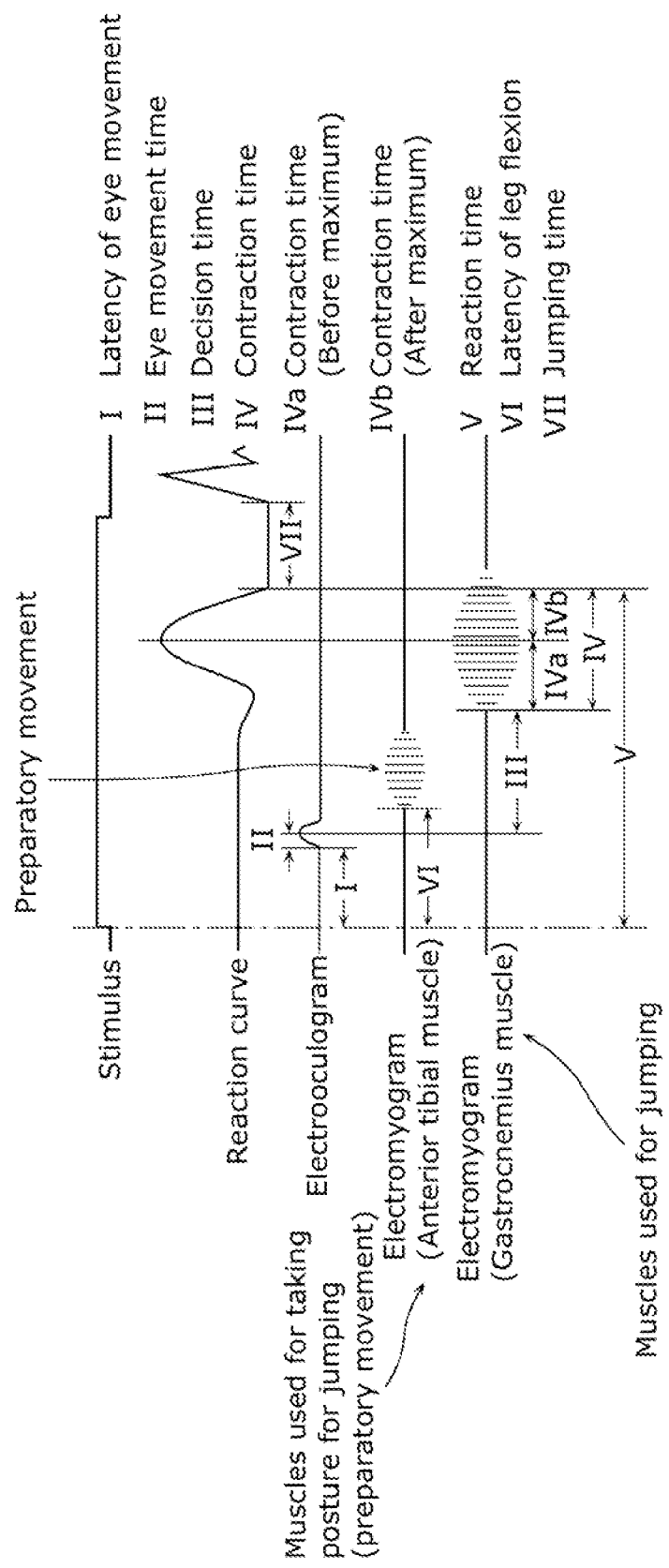
FIG. 3 is a diagram for explaining a preparatory movement.

FIG. 3 is a diagram for explaining a preparatory movement. Specifically, FIG. 3 is a diagram in which description is added to the drawings (FIGS. 2-8) illustrated in Reference Literature 1.

In Reference Literature 1, FIG. 3 is described as follows: "selective reaction condition is set in such a manner that a subject makes a systemic high jump or a low jump according to a light stimulus of an upward or downward arrow randomly displayed on the right or left; a response curve indicating the change in the distortion of a jumping board caused by the subject's reaction, E.O.G. (electrooculogram) indicating the corneoretinal potential due to the eye movement of the subject, and E.M.G. (electromyogram) indicating the tension change in anterior tibial muscle and gastrocnemius muscle of the subject are simultaneously recorded on an oscillograph; and based on the recorded changes, the reaction times are classified as I: latency of eye movement, II: eye movement as time, III: decision time, IV: muscle contraction time V: reaction time, VI: latency of leg flexion, or VII: jumping time."

As shown in the electromyogram (anterior tibial muscle and gastrocnemius muscle) in FIG. 3, anterior tibial muscle as one of the muscles of the shin moved before the movement of the gastrocnemius muscle, which is a muscle in the calf used for making a jump. In other words, before the movement of the gastrocnemius muscle, which is a body part consciously used by a person to make a jump, the anterior tibial muscle which is different from the body part is used for making a jump. In this manner, by contraction of the anterior tibial muscle, the center of gravity of the subject is slightly shifted forward. In other words, in order to maintain the balance against backward shift of the center of gravity caused by the contraction of the gastrocnemius muscle, forward shift of the center of gravity is made as a preparatory movement.

Therefore, the use of such a preparatory movement allows for the prediction of a dangerous movement before the movement is performed by the worker. Therefore, in the following embodiments, the safety device determines whether or not a preparatory movement is being performed which precedes a dangerous movement which causes the worker to move the body into the dangerous area.

Next, a machine tool which is an example of a machine will be described. The machine tool is a machine which has an action part for processing an object such as metal, stone, lumber, or the like (hereafter described as a work object). The action part is a part which operates for processing the work object. Specifically, the action part is a part which is movable along with a part of which is in contact with the work object and the contact part.

For example, the machine tool transforms the work object by a press molding process by a mold, a rolling process by a roller, or a cutting process by a drill, a blade, or a file.

In the case where the machine tool processes the work object, the worker manually sets the work object on a position where the work object can be processed, or manually corrects the position of the work object which is automatically set. In this case, part of the upper body of the worker (hands or the like) is located in an area where the action part of the machine tool operates (hereafter referred to as working area or dangerous area).

At this time, if the action part of the machine tool operates, part of the upper body of the worker is in danger of being injured. For example, in the case where the machine tool is a machine press, part of the upper body of the worker is in danger of being caught in press molds. Moreover, for example, in the case where the machine tool is a rolling mill, part of the upper body of the worker is in danger of being caught in rolling mill rollers. Furthermore, for example, in the case where the machine tool is a cutter, part of the upper body of the worker is in danger of being cut or trimmed by a drill, a blade, or a file.

Hereafter, descriptions will be made about a safety device which prevents the worker from being injured by an action part of a machine such as a machine tool.

Embodiment 1

A safety device 10 according to Embodiment 1 determines whether or not a preparatory movement is being performed which precedes a dangerous movement which causes part of the upper body of the worker to enter a dangerous area. In the present embodiment, descriptions will be made, as an example, about the case where the machine having the action part is a machine tool (machine press).

Figure 4:
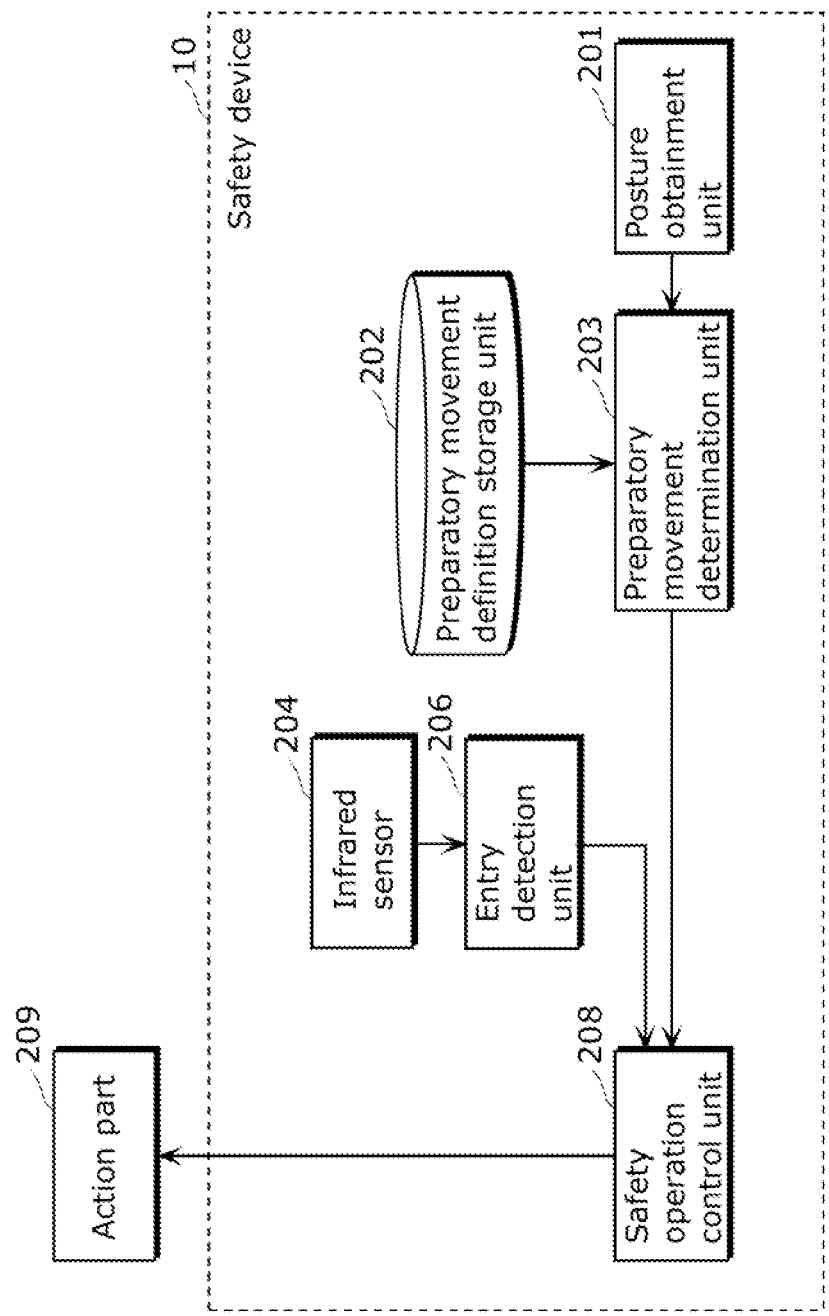
FIG. 4 is a block diagram showing a functional configuration of a safety device according to Embodiment 1 of the present disclosure.

FIG. 4 is a block diagram of the safety device 10 according to Embodiment 1. As shown in FIG. 4, the safety device 10 includes a posture obtainment unit 201, a preparatory movement definition storage unit 202, a preparatory movement determination unit 203, an infrared sensor 204, an entry detection unit 206, and a safety operation control unit 208. FIG. 4 further shows an action part 209 of a machine tool.

The posture obtainment unit 201 obtains a plurality of posture data indicating a posture of at least part of the lower body of the worker. In the present embodiment, the plurality of posture data includes a pressure distribution of the soles of feet of the worker. More specifically, the posture obtainment unit 201 obtains, as the plurality of posture data, the pressure distribution of the soles of feet of the worker from a plurality of pressure sensors installed on the floor surface.

The preparatory movement definition storage unit 202 is a storage device having a storage area such as a non-volatile memory, a hard disk, or the like. The preparatory movement definition storage unit 202 stores a first threshold value and a second threshold value both of which are used for determining whether or not the preparatory movement is being performed.

The preparatory movement determination unit 203 determines, based on a change in the posture indicated by the plurality of posture data, whether or not the preparatory movement preceding the dangerous movement is being performed. Specifically, the preparatory movement determination unit 203 determines that the preparatory movement preceding the dangerous movement is being performed in the case where the change in the posture indicated by the plurality of posture data indicates that the worker is shifting the center of gravity of whole body of the worker in an orientation away from the working area of the action part 209. Then, the preparatory movement determination unit 203 transmits the determination result to the safety operation control unit 208.

Here, the dangerous movement is a movement of at least part of the upper body of the worker approaching the working area of the action part 209. Moreover, the preparatory movement preceding the dangerous movement is a movement performed by the worker before the dangerous movement. In other words, the preparatory movement preceding the dangerous movement is a movement for the worker to unintentionally control a posture before the worker consciously performs the dangerous movement. In the present embodiment, the preparatory movement is a movement for the worker to shift the center of gravity of whole body of the worker in an orientation away from the working area of the action part 209 without moving the positions of both feet.

Moreover, the working area is an area in which the action part 209 operates and a dangerous area in which the worker is highly likely to be injured.

In the present embodiment, the worker's shift in an orientation away from the working area of the action part 209 without moving the position of both feet corresponds to a shift of the position specified by the pressure distribution of the soles of feet of the worker in an orientation away from the working area of the action part. In other words, the preparatory movement determination unit 203 determines that the preparatory movement is being performed in the case where the position specified by the pressure distribution is shifting in an orientation away from the working area of the action part.

It should be noted that the position specified by the pressure distribution is a center-of-gravity position of the pressure distribution of the soles of feet. It should be noted that the position specified by the pressure distribution does not necessarily have to be the center-of-gravity position of the pressure distribution. For example, the position specified by the pressure distribution may be the position at which the highest pressure value is measured.

Furthermore, in the present embodiment, the preparatory movement determination unit 203 determines whether or not the preparatory movement preceding the dangerous movement is being performed, based on a moving speed, a moving time, or a moving distance of the center-of-gravity position in an orientation away from the working area of the action part. In other words, the preparatory movement determination unit 203 determines that the preparatory movement is being performed in the case where the center-of-gravity position of the pressure distribution is shifting in an orientation away from the working area of the action part, and a moving speed, a moving time, or a moving distance of the center-of-gravity position in an orientation away from the working area of the action part is from greater than or equal to the first threshold value to less than the second threshold value. The first threshold value and the second threshold value are stored in the preparatory movement definition storage unit 202.

The infrared sensor 204 detects that the worker's body has entered a detection area which includes the dangerous area and which is an area greater than the dangerous area. Specifically, the infrared sensor 204 detects that the worker's body has entered the detection area by detecting that an infrared ray has been blocked by the worker's body. Then, the infrared sensor 204 transmits, to the entry detection unit 206, a detection signal indicating the detection of the body of a worker 100.

It should be noted that the safety device 10 includes the infrared sensor 204 in the present embodiment, but does not necessarily have to include the infrared sensor 204. In other words, the safety device 10 does not necessarily have to detect the entry of the worker's body into the detection area with the use of infrared ray. For example, the safety device 10 may include an entry detection sensor for detecting the entry of the body of the worker 100 into the detection area by capturing an image of the detection area and by determining whether or not the worker's body is included in the image.

The entry detection unit 206 determines that the worker's body is entering the detection area in the case where a detection signal is received from the infrared sensor 204. Then, the entry detection unit 206 transmits the determination result to the safety operation control unit 208.

The safety operation control unit 208 controls the action part 209. Specifically, the safety operation control unit 208 stops the action part 209 in the case where it is determined by the entry detection unit 206 that the body of the worker 100 is entering a detection area 130.

Moreover, the safety operation control unit 208 slows down the action part 209 in the case where it is determined by the preparatory movement determination unit 203 that the preparatory movement preceding the dangerous movement is being performed. In other words, the safety operation control unit 208 controls the action part 209 such that the speed of the action part 209 does not exceed a certain speed in the case where it is determined by the preparatory movement determination unit 203 that the preparatory movement is being performed.

It should be noted that the safety operation control unit 208 may stop the action part 209 in the case where it is determined by the preparatory movement determination unit 203 that the preparatory movement preceding the dangerous movement is being performed.

Next, a scene in which the above described safety device 10 is used will be described. First, a scene in which a press work is performed in the machine press will be described with reference to FIGS. 5A and 5B.

Figure 5A:
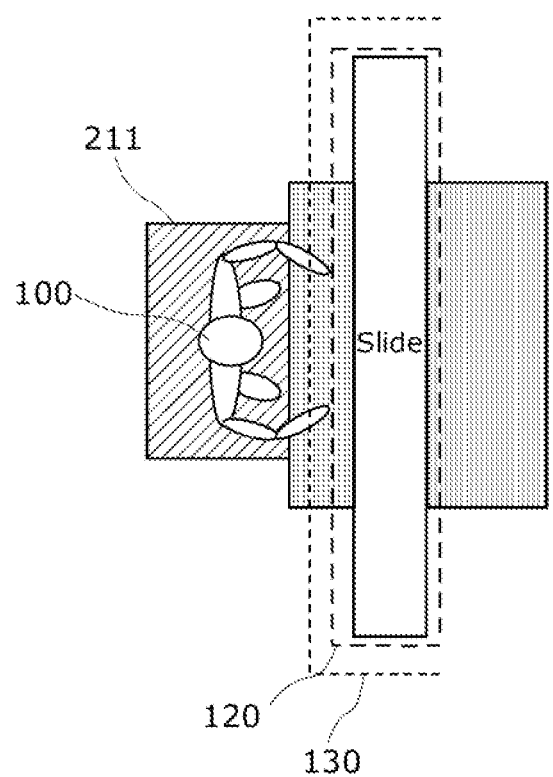
FIG. 5A is a diagram showing a scene in which a worker is setting a work object on a pressing position.

FIG. 5A shows a scene in which the worker 100 is setting a work object W on a press position. Moreover, FIG. 5B shows a scene in which the machine press is processing the work object W.

In FIG. 5A, the worker 100 is setting the work object W on the press position. In this case, parts of the hands and arms of the worker 100 reach a dangerous area 120. However, the worker 100 is not caught in the action part 209 because the action part 209 is at a standstill.

Figure 5B:
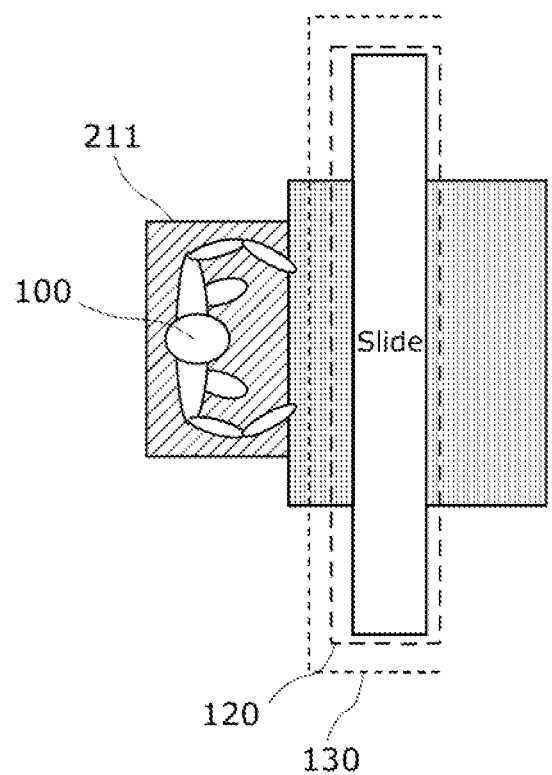
FIG. 5B is a diagram showing a scene in which the machine press is processing the work object.

Meanwhile, in FIG. 5B, the action part 209 of the machine press is in operation. In other words, the machine press is in a state in which a press work is being performed for the work object W. However, since the body of the worker 100 is not in the dangerous area 120, the body of the worker 100 is not caught in the action part 209. Generally, the press work for the work object W is started after the worker 100 reaches a position a predetermined distance away from the dangerous area 120.

However, the worker 100 sometimes causes the upper body to lean over the dangerous area 120 in order to confirm the state of the work object W during the operation of the action part 209 of the machine press. In other words, during the press work, there is a case where the worker 100 brings part of the body closer to the dangerous area 120 as shown in FIG. 5A.

In this case, the infrared sensor 204 installed around the dangerous area 120 detects that part of the body of the worker 100 has entered the detection area 130 which is larger than the dangerous area 120. Then, the infrared sensor 204 transmits, to the entry detection unit 206, a detection signal indicating the detection of the body of the worker 100.

The entry detection unit 206 determines that the body of the worker 100 is entering the detection area in the case where the detection signal is received from the infrared sensor 204. The safety operation control unit 208 transmits a stop control signal to the action part 209 in the case where it is determined that the body of the worker 100 is entering the detection area 130. As a result, the action part 209 comes to a stop.

In this way, in the case where part of the body of the worker 100 has entered the detection area 130, the machine press suspends the work for preventing the worker 100 from being injured. However, in the case where the body of the worker 100 is approaching the dangerous area 120 at a speed that is faster than initially estimated, there is a case where the action part 209 is too late to stop.

Therefore, in order to avoid being too late for the action part 209 to stop, it can be considered that the detection area 130 is sufficiently widened. However, in the case where the detection area 130 is widened, the action part 209 comes to a stop when the worker 100 is only a bit closer to the machine press. In other words, the safety device 10 causes the action part 209 to stop even when the body of the worker 100 does not enter the dangerous area 120. Therefore, the working efficiency of the machine tool is decreased.

Therefore, in the present embodiment, the safety of the worker 100 is ensured by determining that the preparatory movement preceding the dangerous movement is being performed and by avoiding widening the scope of the detection area.

Hereafter, the preparatory movement of the worker 100 preceding the dangerous movement will be described.

A movement in which the worker 100 brings part of the body closer to the dangerous area 120 (dangerous movement) is a movement consciously performed by the worker 100. A typical example of the dangerous movement is a movement of replacing the work object W or a movement of changing the position of the work object W with the use of at least one of the upper limbs. Furthermore, the dangerous movement includes a movement of removing the work object W on the machine press, a movement of putting the work object W on the machine press, or a movement of shifting or rotating the position of the work object W on the machine press with the use of at least one of the upper limbs. Moreover, the dangerous movement includes a movement in which, for a maintenance work for the machine press or the like, the worker 100 puts the right hand or the left hand on the lower slide or a surrounding area of the lower slide, or a movement in which the worker 100 leans the lumbar region or the buttock region against the lower slide or a surrounding area of the lower side.

Actually, the movement in which the worker 100 brings part of the body closer to the dangerous area 120 is performed by several stages. For example, assume that decision-making for correcting the position of the work object W is made by the worker who is standing near the dangerous area of the front face of the machine press and is directing the body toward the machine press.

In this case, in order to realize the correction of the position of the work object W, the motion of both arms and the upper body is determined. After the motion of both arms and the upper body is determined, in order to adjust a posture for withstanding a change in the weight balance of the body caused by the motion of both arms and the upper body, the motion of the back muscles and abdominal muscles which moves the center of gravity of the lumbar region and the motion of muscles around the pelvis which adjusts an angle of the lumbar region against legs are determined. As a result, a knee angle is larger and the buttock region shifts to the back side.

Here, the change in the weight balance of the body will be described. The case will be described as an example where a movement is started from a state in which the worker is standing upright and pulling both arms down. First, the body is naturally balanced in a state in which the worker is standing upright and pulling both arms down, as shown in (a) of FIG. 6. If the worker puts both arms forward as shown in (c) of FIG. 6 while the body is balanced in this way, the center of gravity of whole body of the worker is shifted forward by the weight of both arms. As a result, the body loses its balance and leans forward, and therefore the worker cannot keep standing upright.

Figure 6:
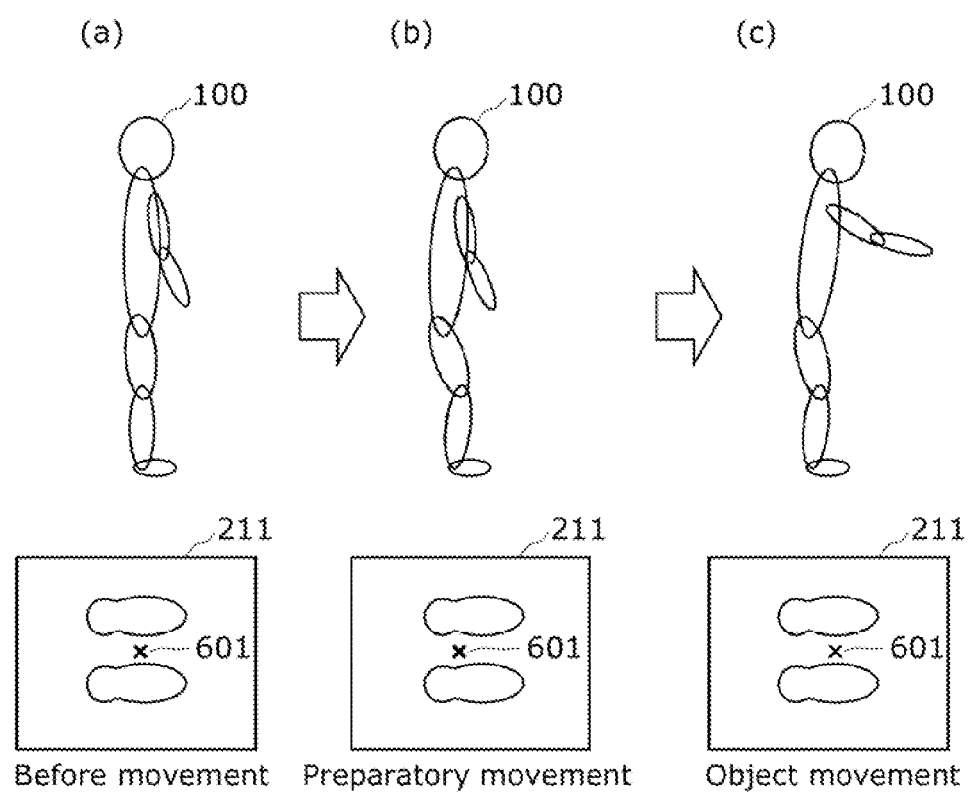
FIG. 6 is a diagram for explaining a preparatory movement preceding a dangerous movement.

Therefore, the worker, as shown in (b) of FIG. 6, shifts the center of gravity in an orientation for making up for in advance a shift of the center of gravity by the weight of both arms (that is, an orientation which is toward the back of the worker and opposite to the working area of the action part that the worker is trying to extend the arms) and is prepared for a change in the weight balance caused by the raising of both arms.

Therefore, as shown in (b) of FIG. 6, the worker pulls back the lumbar region without moving the grounding positions of both feet such that the center of gravity is shifted backward with safety. By pulling back the lumbar region and shifting the center of gravity of the body backward, the worker can shift the center of gravity backward without a backward shift of hand pivot points when extending the arms forward, and therefore the worker does not have to shift the working position in which the worker initially intended to work by extending the arms forward.

The movement of pulling back the lumbar region, as shown in (b) of FIG. 6, is a movement in which the worker extends the knee bending angle and shifts the buttock region to the back side. With the movement, the center of gravity is shifted to the side opposite to the back side of the worker, that is, the working area of the action part which the worker is trying to extend the arms forward. Following the movement, the worker extends the arms to the working area ahead. As a result, as shown in (c) of FIG. 6, the center of gravity of whole body of the worker is shifted to the same position as that in which the worker is standing upright or to a further front position.

The movement of increasing the knee angle and shifting the buttock region to the back side in this way corresponds to the preparatory movement preceding the dangerous movement. The preparatory movement is unintentionally performed. After the preparatory movement is performed, the conscious movement by the worker 100 is performed in which the position of the work object W is corrected by the motion of both arms and the lumbar region.

As described above, in the case where a person consciously performs a movement, the preparatory movement for adjusting a posture is unintentionally performed before the conscious movement. Body regions which perform a motion for the preparatory movement tend to be a body region different from those which perform the motion for the conscious movement.

Especially, in the case where the conscious movement is performed by the large motion of the upper limbs as shown in the above described dangerous movement, the preparatory movement preceding the conscious movement is performed by the motion of the lower body which is centered on the lumbar region and the legs.

Therefore, the safety device 10 according to the present embodiment detects with high accuracy that the body of the worker 100 is about to enter the dangerous area before the entry of the body of the worker 100 into the dangerous area, by using the preparatory movement preceding the dangerous movement.

Hereafter, the determination processes for the preparatory movement by the safety device 10 will be described in detail.

The posture obtainment unit 201 obtains a plurality of posture data indicating the posture of the worker 100 in a distance in which the worker 100 can enter the dangerous area of the machine press. Specifically, the posture obtainment unit 201 obtains the plurality of posture data indicating the posture of the lower body of the worker 100 (at least one of the left and right legs and the left and right feet).

Here, the posture obtainment unit 201 obtains the plurality of posture data from a pressure sensor sheet 211 which is installed on the floor surface ahead of the machine press. The pressure sensor sheet 211 measures a pressure distribution of the soles of feet of the worker 100 who is positioned in front of the machine press, and transmits, as the plurality of posture data, the measured result to the posture obtainment unit 201.

For example, as shown in FIG. 6, in the case where the dangerous movement is performed in which the worker brings the upper body closer to the dangerous area, a center-of-gravity position 601 of the pressure distribution of the soles of feet is moved in a direction opposite to the direction of the machine press ((b) of FIG. 6). The shift of the center-of-gravity position is caused by the preparatory movement preceding the dangerous movement. Then, the pressure sensor sheet 211 measures the pressure distribution of the soles of feet of the worker 100.

Figure 7:
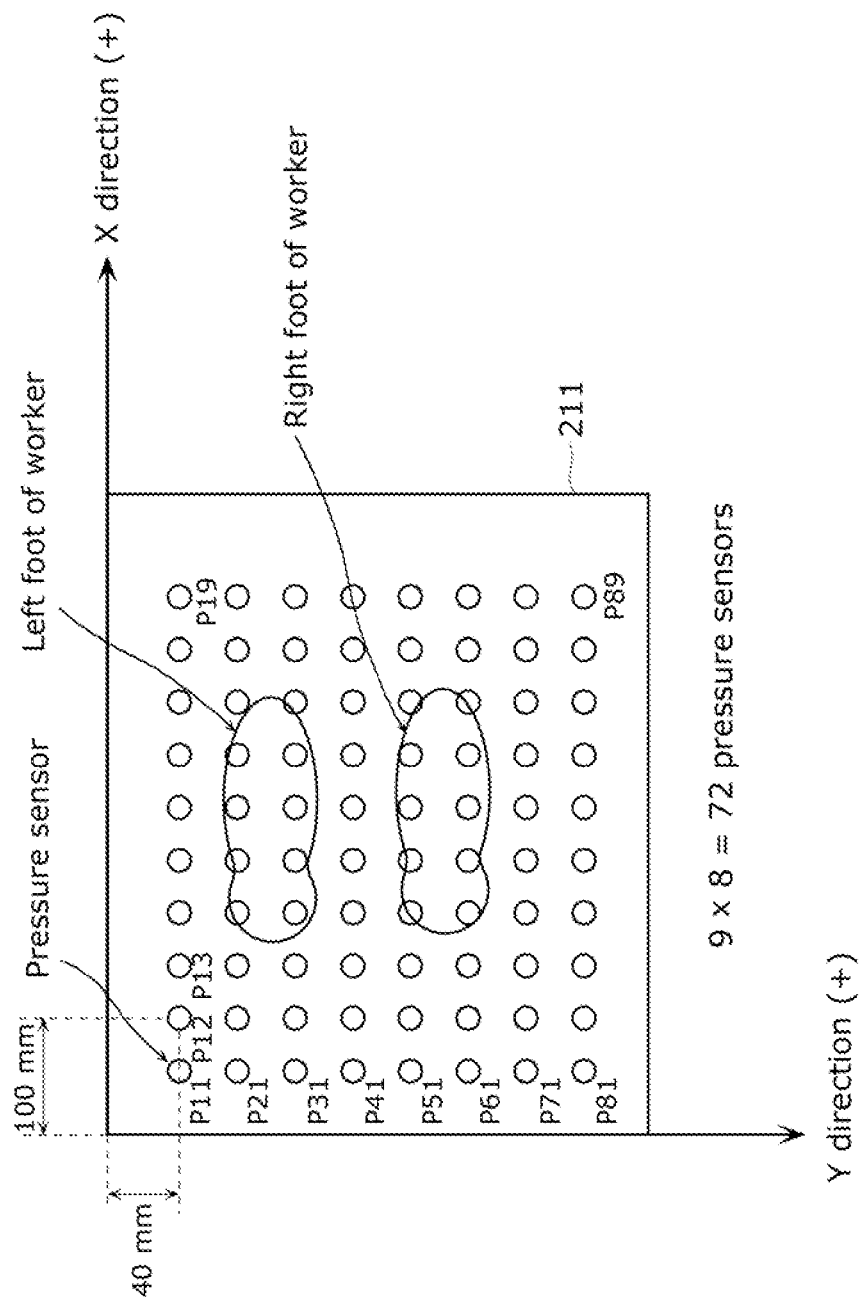
FIG. 7 is a diagram showing an example of a pressure sensor sheet according to Embodiment 1.

Specifically, as shown in FIG. 7, the pressure sensor sheet 211 includes 72 pressure sensors (P11, P12, P13, . . . , and P89) arranged in a matrix. Each of the pressure sensors measures pressure in each of the arranged location. Specifically, as shown in FIG. 8, each of the 72 pressure sensors measures a pressure value in a predetermined time interval (for example, around 10 ms).

The posture obtainment unit 201 calculates the center-of-gravity position of the pressure distribution measured by the pressure sensor sheet 211. Specifically, the posture obtainment unit 201 calculates the center-of-gravity position (Xg, Yg) as indicated in Expression 1.

[Math. 1]

$$Xg = \frac{Px \times Wxy}{\sum Wxy}$$
$$Yg = \frac{Py \times Wxy}{\sum Wxy}$$
(Expression 1)

Here, Px denotes a position in the X direction. Here, Py denotes a position in the Y direction. Moreover, Wxy denotes a pressure value measured at position (Px, Py). The posture obtainment unit 201 transmits the calculated center-of-gravity position to the preparatory movement determination unit 203. It should be noted that a negative orientation in the X direction corresponds to an orientation away from the working area of the action part.

Next, the preparatory movement determination unit 203 calculates a moving speed of the center-of-gravity position. Then, the preparatory movement determination unit 203 determines whether or not the preparatory movement is being performed with reference to a preparatory movement definition table 202a stored in the preparatory movement definition storage unit 202.

In the preparatory movement definition storage unit 202, for example, the preparatory movement definition table 202a is stored as shown in FIG. 9.

The preparatory movement definition table 202a of FIG. 9 shows that in the case where a distance from the machine press to the feet of the worker is from 500 mm to 800 mm and the moving speed of the center-of-gravity position in the X direction is −10 to −5 mm/s, the worker is performing a preparatory movement preceding a dangerous movement. In other words, the preparatory movement definition table 202a shows that in the case where the moving speed of the center-of-gravity position in an orientation away from the action part 209 (negative orientation in X direction) is from greater than or equal to the first threshold value (5 mm/s) to less than the second threshold value (10 mm/s), the preparatory movement preceding the dangerous movement is being performed.

Then, the preparatory movement definition table 202a shows that 500 ms after the preparatory movement, the upper body of the worker enters the dangerous area. In this way, the preparatory movement definition table 202a stores the first threshold value and the second threshold value regarding the moving speed of the center-of-gravity position for determining whether or not the preparatory movement of the lower body is being performed before the dangerous movement of the upper body approaching the dangerous zone of the machine press is performed.

Therefore, the preparatory movement determination unit 203 determines whether or not the worker 100 is performing the preparatory movement by comparing the moving speed of the center-of-gravity position calculated from the plurality of posture data obtained from the posture obtainment unit 201 with the first threshold value and the second threshold value stored in the preparatory movement definition table 202a. The preparatory movement determination unit 203 outputs, to the safety operation control unit 208, a signal indicating the determination result when it is determined that the preparatory movement is being performed.

Figure 10:
FIG. 10 is a diagram showing an example of a shift of a center-of-gravity position according to Embodiment 1.

For example, as shown in FIG. 10, a coordinate of the center-of-gravity position of the pressure distribution of the soles of feet of the worker (hereafter, referred to as center-of-gravity coordinate) is inputted every 10 msec into the preparatory movement determination unit 203 from the posture obtainment unit 201.

FIG. 10 shows an example of the center-of-gravity coordinate inputted every 10 msec from 15 minutes and 20.130 seconds and the center-of-gravity moving speed calculated from the center-of-gravity coordinate. It should be noted that here, the case will be described where it is already known that a distance from the machine press to the soles of feet ranges from 500 to 800 mm.

The center-of-gravity moving speed in an X direction is greater than −5 mm/s at times from 15 minutes and 20.130 seconds to 15 minutes and 20.170 seconds. In other words, the moving speed of the center-of-gravity position in an orientation away from the action part 209 (negative orientation of X direction) is less than the first threshold value (here, "5"). Therefore, the preparatory movement determination unit 203 determines that the preparatory movement is not being performed.

Furthermore, when time advances to 16 minutes and 32.440 seconds, the center-of-gravity moving speed in the X direction reaches −5 mm/s which is indicated in a preparatory movement ID "001" in FIG. 9. In other words, the moving speed of the center-of-gravity position in an orientation away from the action part 209 (negative orientation of X direction) is from greater than or equal to the first threshold value (here, "5") to less than the second threshold value (here, "10"). Therefore, the preparatory movement determination unit 203 determines that the preparatory movement is being performed.

The preparatory movement determination unit 203 outputs, to the safety operation control unit 208, a signal indicating the determination result. The safety operation control unit 208 slows down the action part 209 when it is determined by the preparatory movement determination unit 203 that the preparatory movement is being performed.

Figure 11:
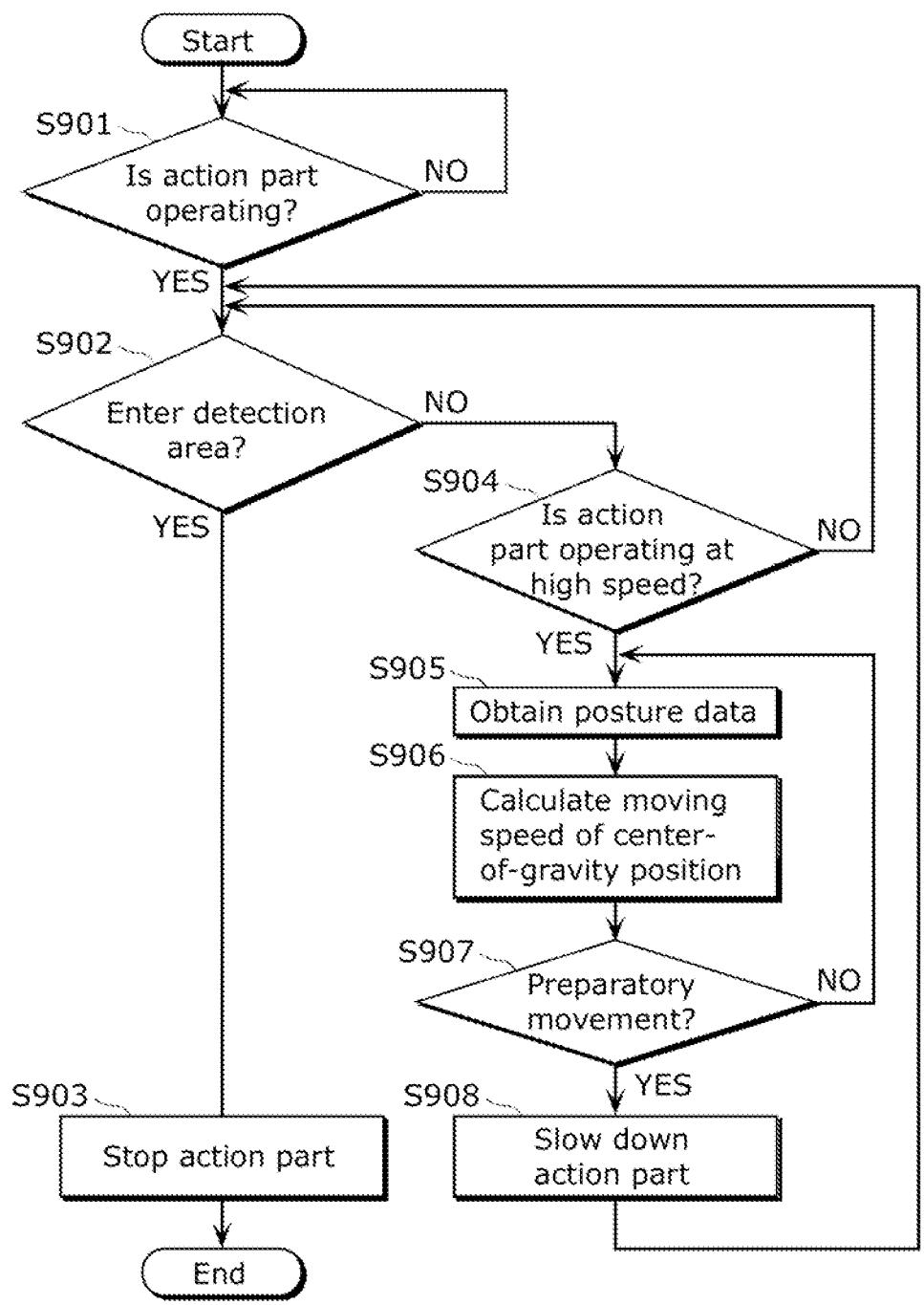
FIG. 11 is a flowchart showing operations of the safety device according to Embodiment 1.

The operations of the above described safety device 10 will be described with reference to the flowchart of FIG. 11.

First, the safety operation control unit 208 determines whether or not the action part 209 is operating (S901). In the case where the action part 209 is not operating (NO in S901), a process of Step S901 is repeated. Meanwhile, in the case where the action part 209 is operating (YES in S901), the entry detection unit 206 detects, by using a signal from the infrared sensor 204, whether or not the worker is entering the detection area (S902).

In the case where the worker is entering the detection area (YES in S902), the safety operation control unit 208 stops the action part 209 (S903) and then ends the process.

Meanwhile, in the case where the worker is not entering the detection area (NO in S902), the safety operation control unit 208 determines whether or not the action part 209 is operating at a high speed (S904). Specifically, the safety operation control unit 208 determines whether or not the action part 209 is operating at a speed greater than or equal to a predetermined speed.

Here, in the case where the action part 209 is operating at a high speed (YES in S904), the safety device 10 performs the following determination processes (S905 to S908). For example, in the case where the action part 209 is operating at a speed greater than or equal to 200 mm/sec, it take time to cause the action part 209 to stop. Therefore, in the case where the action part 209 is operating at a speed greater than or equal to a predetermined speed, the safety device 10 determines whether or not the preparatory movement is being performed and then controls the action part 209 according to the determination result.

Meanwhile, in the case where the action part 209 is not operating at a high speed (NO in S904), the flow returns to the process of Step S902. This is because, for example, in the case where the action part 209 is operating at a speed less than 200 mm/sec, it does not take time to cause the action part 209 to stop. In other words, even if the action part 209 is caused to stop after an entry into the detection area is detected by the infrared sensor 204, the possibility is low that the worker is injured.

Here, the determination processes for the preparatory movement (S905 to S908) will be described. In the case where it is determined that the action part 209 is operating at a high speed (YES in S904), the posture obtainment unit 201 obtains a plurality of posture data including the pressure distribution of the soles of feet of the worker 100 (S905). Specifically, the posture obtainment unit 201, for example, obtains the pressure distribution of the soles of feet of the worker 100 measured by the pressure sensor sheet 211. Then, the posture obtainment unit 201 calculates the center-of-gravity position of the obtained pressure distribution.

Then, the preparatory movement determination unit 203 calculates a moving speed of the center-of-gravity position in an orientation away from the dangerous area (S906). Then, the preparatory movement determination unit 203 determines whether or not the preparatory movement preceding the dangerous movement is being performed, by determining whether or not the calculated moving speed of the center-of-gravity position meets a condition stored in the preparatory movement definition storage unit 202 (S907).

Specifically, the preparatory movement determination unit 203 determines that the preparatory movement preceding the dangerous movement is being performed in the case where the calculated moving speed of the center-of-gravity position is from greater than or equal to the first threshold value to less than the second threshold value. Conversely, the preparatory movement determination unit 203 determines that the preparatory movement preceding the dangerous movement is not being performed in the case where the calculated moving speed of the center-of-gravity position is less than the first threshold value, or greater than or equal to the second threshold value.

Here, in the case where it is determined that the preparatory movement is not being performed (NO in S907), the flow returns again to the process of Step S905. Meanwhile, in the case where it is determined that the preparatory movement is being performed (YES in S907), the determination result is outputted to the safety operation control unit 208.

Then, the safety operation control unit 208 controls such that the action part 209 is not operating at a speed greater than the predetermined speed (S908) because there is a possibility that the body of the worker enters the dangerous area a predetermined time later (for example, 200 msec later). In other words, the safety operation control unit 208 slows down the action part 209 which is operating at a high speed.

As described above, the safety device 10 according to the present embodiment can cause the action part 209 to slow down or stop in the case where it is determined that the worker is performing the preparatory movement preceding the dangerous movement such as one in which the worker is entering the dangerous area. Therefore, the safety device 10 can prevent the worker from being injured.

Moreover, the safety device 10 according to the present embodiment can determine, by using a change in the posture of the lower body of the worker, that the preparatory movement preceding the dangerous movement which brings the upper body of the worker closer to the working area of the action part is being performed. The preparatory movement is a movement which is unintentionally performed by a person before the person performs a conscious movement. In other words, the worker unintentionally performs the preparatory movement before the dangerous movement which is a conscious movement. Therefore, by determining that the preparatory movement is being performed, it is possible to detect with high accuracy that a dangerous movement is performed before the dangerous movement is performed.

Moreover, the safety device 10 can determine whether or not the preparatory movement is being performed, by using the position specified by the pressure distribution of the soles of feet of the worker. In other words, it is possible to detect that the worker is shifting the center of gravity of whole body of the worker in an orientation away from the working area of the action part, by using a shift of the position specified by the pressure distribution of the soles of feet of the worker. Therefore, it is possible to determine with relative ease that the preparatory movement preceding the dangerous movement is being performed.

Moreover, the safety device 10 can determine whether or not the preparatory movement is being performed, by using the center-of-gravity position specified by the pressure distribution of the soles of feet of the worker. The preparatory movement is a movement for controlling the posture and therefore is accompanied by the shift of the center of gravity of whole body of the worker. Therefore, it is possible to determine with higher accuracy that the preparatory movement preceding the dangerous movement is being performed, by using the center-of-gravity position of the pressure distribution of the soles of feet of the worker.

Moreover, the safety device 10 can determine that the preparatory movement is being performed in the case where a moving speed, a moving time, or a moving distance of the center-of-gravity position in an orientation away from the working area of the action part is greater than or equal to the first threshold value. In other words, it is possible to prevent an erroneous determination that the preparatory movement is being performed in the case where the shift of the center-ofgravity position in an orientation away from the working area of the action part is a small shift different from the shift caused by the preparatory movement. Therefore, it is possible to determine with higher accuracy that the preparatory movement preceding the dangerous movement is being performed.

Moreover, the safety device 10 can determine that the preparatory movement is being performed in the case where a moving speed, a moving time, or a moving distance of the center-of-gravity position in an orientation away from the working area of the action part is less than the second threshold value. In other words, it is possible to prevent an erroneous determination that the preparatory movement is being performed in the case where the shift of the center-of-gravity position in an orientation away from the working area of the action part is a great shift different from the shift caused by the preparatory movement. Therefore, it is possible to determine with higher accuracy that the preparatory movement preceding the dangerous movement is being performed.

It should be noted that in the present embodiment, the preparatory movement determination unit 203 determines whether or not the preparatory movement is being performed by using both the first threshold value and the second threshold value, but whether or not the preparatory movement is being performed may be determined by using one of the first threshold value and the second threshold value.

Embodiment 2

A safety device 10 according to Embodiment 2 further determines whether or not the preparatory movement is being performed, by using a distance between the working area of the action part and the worker, a body orientation of the worker, and a body size of the worker. With this, the safety device 10 can determine with high accuracy whether or not the preparatory movement is being performed also in a machine tool which handles a large work object. Hereafter, the safety device 10 according to the present embodiment will be described with reference to the drawings.

Figure 12:
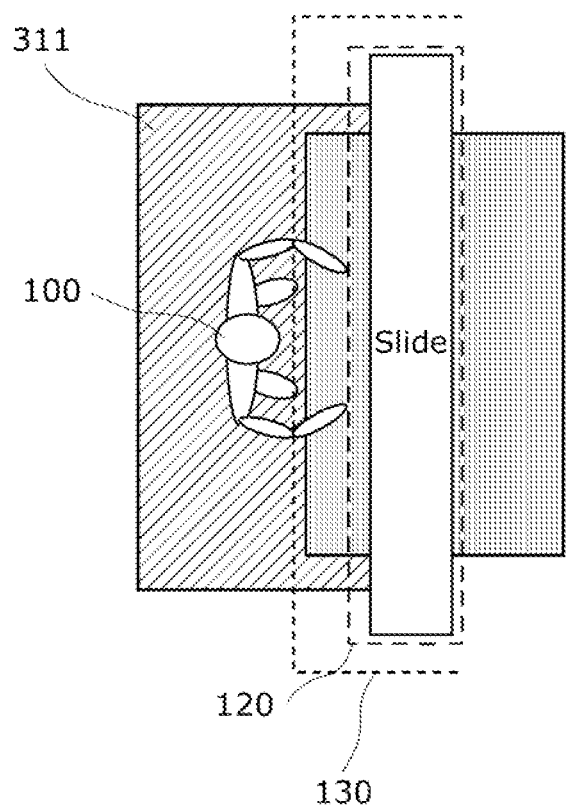
FIG. 12 is a diagram showing a scene in which a worker is setting a work object on a pressing position.

FIG. 12 shows a scene in which the worker 100 is setting a work object W on a press position. As shown in FIG. 12, a pressure sensor sheet 311 according to the present embodiment has a greater area than the pressure sensor sheet according to Embodiment 1. In other words, the pressure sensor sheet 311 can measure pressure in a wide area.

Figure 13:
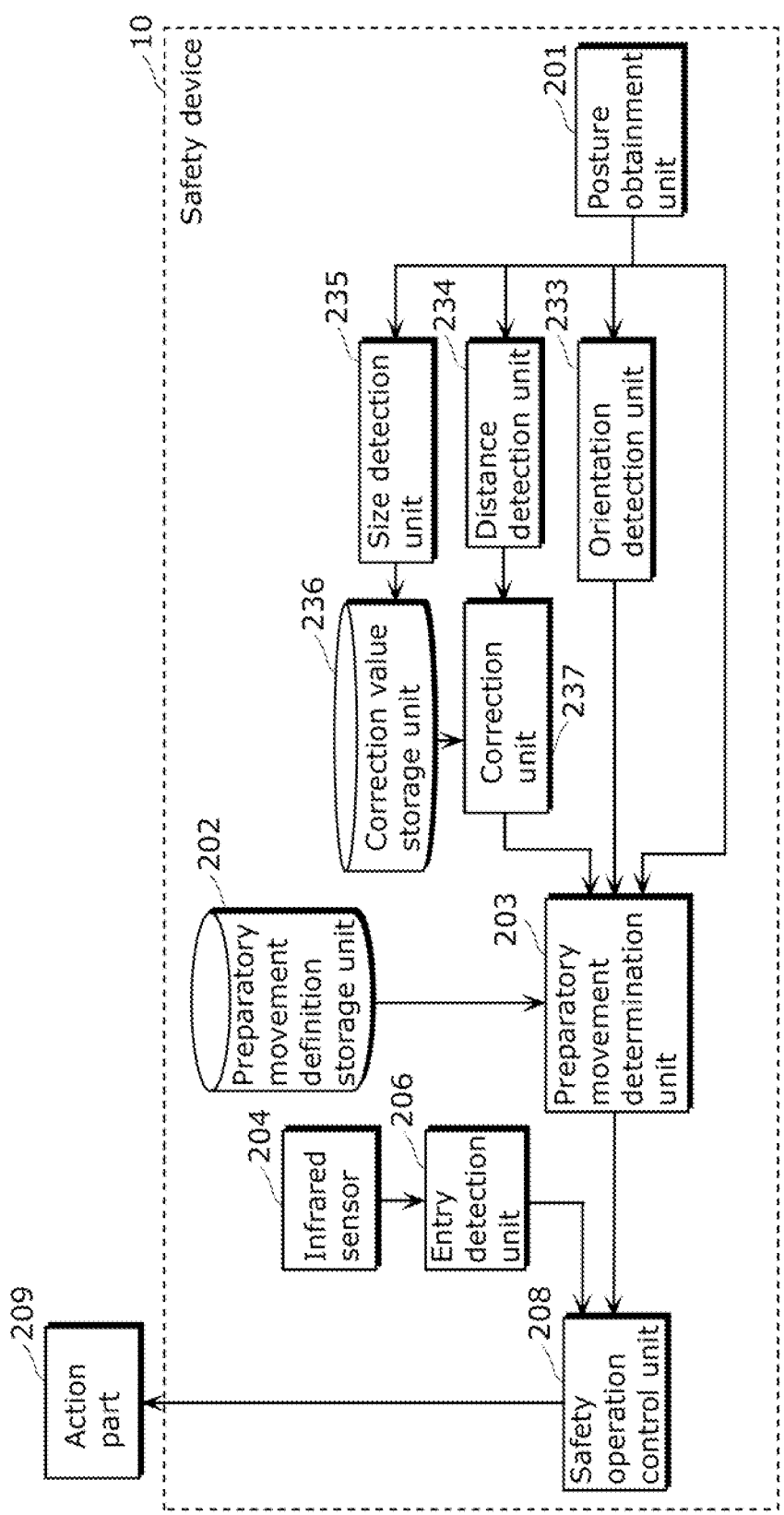
FIG. 13 is a block diagram showing a functional configuration of a safety device according to Embodiment 2 of the present disclosure.

FIG. 13 is a block diagram of the safety device 10 of a machine tool according to Embodiment 2. It should be noted that in FIG. 13, descriptions of processing units which have the same functions as those in FIG. 4 will be omitted.

The safety device 10, as similarly to that according to Embodiment 1, includes the posture obtainment unit 201, the preparatory movement definition storage unit 202, the preparatory movement determination unit 203, the infrared sensor 204, the entry detection unit 206, and the safety operation control unit 208. Furthermore, the safety device 10 includes an orientation detection unit 233, a size detection unit 235, a correction value storage unit 236, and a correction unit 237.

A distance detection unit 234 detects a distance between the working area of the action part 209 and the worker 100. In the present embodiment, the distance detection unit 234 detects, as a distance between the working area of the action part 209 and the worker 100, a distance between the machine press and the feet of the worker 100, based on a pressure distribution measured by the pressure sensor sheet 311. Specifically, the distance detection unit 234 detects, as a distance between the working area of the action part 209 and the worker 100, a distance from the position nearest the machine press among the positions in which positive pressure is measured by the pressure sensor sheet 311 to the machine press.

The size detection unit 235 detects a size of at least part of the worker's body. In the present embodiment, the size detection unit 235 detects the size of the soles of feet of the worker based on a pressure distribution obtained by the posture obtainment unit 201.

It should be noted that the size detection unit 235 does not necessarily have to detect the size of the soles of feet of the worker. For example, the size detection unit 235 may detect the body height of the worker based on a captured image of the worker or the like.

The correction value storage unit 236 is a storage device such as a memory. In the correction value storage unit 236, a correction value which is obtained from the body size of the worker detected by the size detection unit 235 is stored.

The correction unit 237 corrects a distance detected by the distance detection unit 234 based on the size detected by the size detection unit 235. Specifically, the correction unit 237 corrects the detected distance such that when a size of at least part of the worker's body is larger, the distance is shorter.

This is because a possibility that the worker enters the dangerous area is varied according to the body size of the worker. In other words, even if the distance from the dangerous area is the same, a worker with a large body is more likely to enter the dangerous area than a worker with a small body. Therefore, the correction unit 237 corrects a distance detected by the distance detection unit 234 according to the size detected by the size detection unit 235.

The following shows an example of a correction method.

Among a plurality of pressure sensors owned by the pressure sensor sheet 311, the size detection unit 235 extracts, as a group of pressure sensors corresponding to the area of the soles of feet of the worker, a group of pressure sensors which are mutually adjacent and in which positive pressure values are measured. For example, the size detection unit 235 extracts a group of pressure sensors which are depicted by hatching and correspond to each of the left and right foot areas of the worker in FIG. 14.

Figure 14:
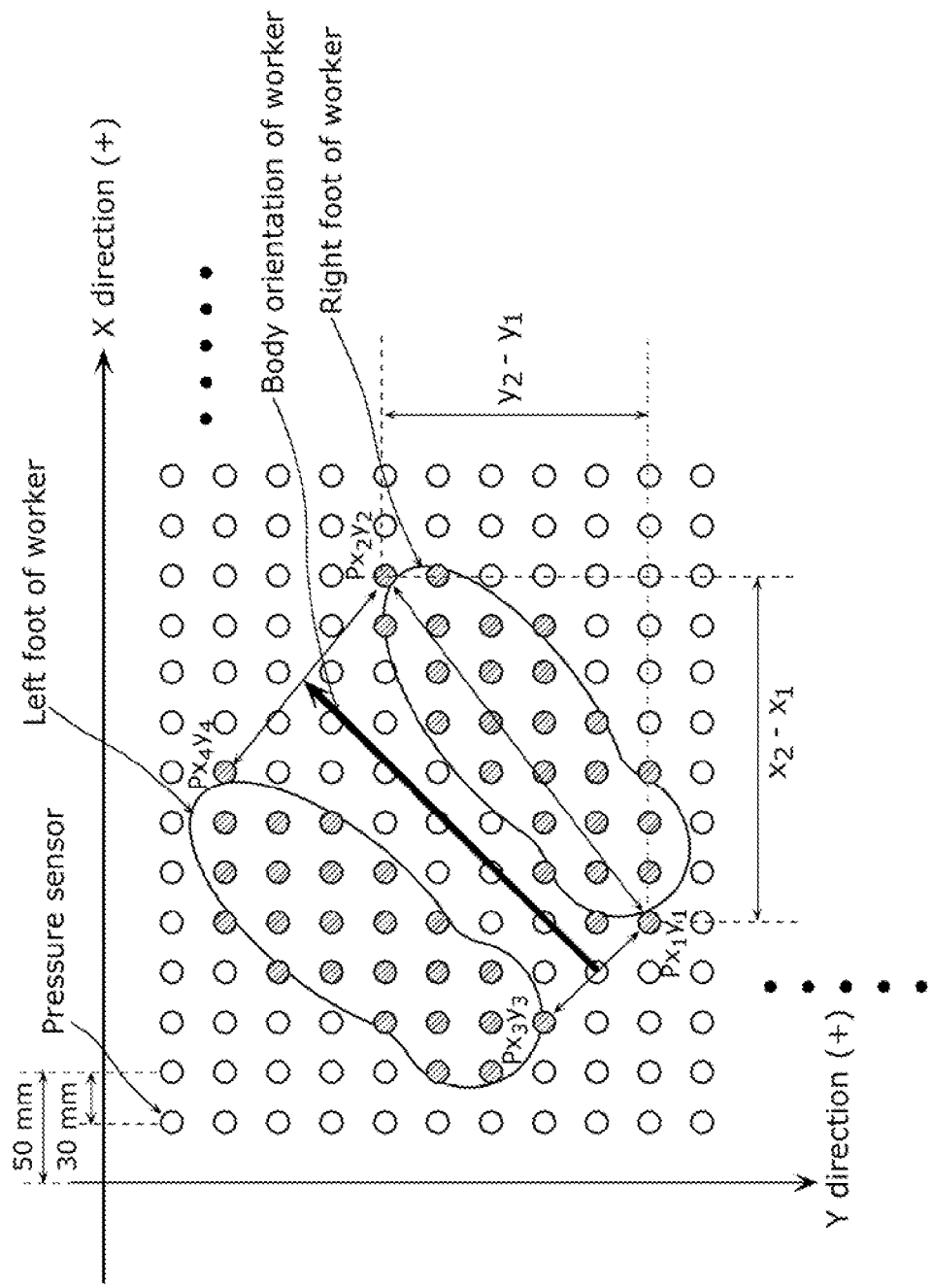
FIG. 14 is a diagram showing an example of a pressure sensor sheet according to Embodiment 2.

Then, the size detection unit 235 calculates, as a major axis length L of the soles of feet of the worker 100, a distance between two sensors which are most distant with each other, in at least one group of the extracted pressure sensors. In FIG. 14, the size detection unit 235 calculates a distance between a pressure sensor Px1y1 and a pressure sensor Px2y2. Here, since the mutually adjacent pressure sensors are 30 mm away from each other, the major axis length L is calculated as Expression 2.

[Math. 2]

$$L = 30\sqrt{(x_2-x_1)^2+(y_2-y_1)^2} \qquad \text{(Expression 2)}$$

In an example of FIG. 14, the major axis length L is 258 mm.

Then, the size detection unit 235 calculates L/Ls which is a ratio of the major axis length L to a standard major axis length Ls which is determined in advance. In the case where the standard major axis length Ls is 280 mm, for example, the size detection unit 235 calculates that L/Ls which is the ratio of the major axis length L to the standard major axis length Ls is 0.921 (=258/280). Then, the size detection unit 235 stores the calculated ratio as a correction value in the correction value storage unit 236.

Therefore, the correction unit 237 corrects a distance detected by the distance detection unit 234 with the use of the correction value stored in the correction value storage unit 236. Specifically, the correction unit 237 outputs, as a distance after correction, a value which is produced by division of the distance detected by the distance detection unit 234 by the correction value (0.921) to the preparatory movement determination unit 203. In other words, the correction unit 237 corrects the distance such that when the size of the soles of feet of the worker is larger, the distance is shorter.

In this example, the correction unit 237 corrects the distance such that the distance from the worker 100 to the dangerous area 120 is longer than the actual distance, because the size of the soles of feet of the worker 100 is smaller than the standard level. Conversely, in the case where the size of the soles of feet of the worker 100 is larger than the standard level, the distance from the worker 100 to the dangerous area 120 is corrected to be shorter than the actual distance.

The orientation detection unit 233 detects a body orientation of the worker. Specifically, the orientation detection unit 233 detects a degree of an angle of the worker's front body with respect to the front face of the machine press from a form of an area of the pressure sensors which are mutually adjacent and in which positive pressure values are measured.

The following shows an example of a method of detecting a body orientation of the worker.

First, the orientation detection unit 233 identifies two sensors which are most distant from each other in each of the groups of pressure sensors which are mutually adjacent and in which positive pressure values are measured. The two sensors specified in this way are mostly located under the tiptoes and the heels. In FIG. 14, two pressure sensors (Px1y1, Px2y2) corresponding to the right foot and two pressure sensors (Px3y3, Px4y4) corresponding to the left foot are specified.

Then, the orientation detection unit 233 detects, as a body orientation of the worker, an orientation of a vector which connects (i) a midpoint of a line segment connecting a pressure sensor under the right heel and a pressure sensor under the left heel and (ii) a midpoint of a line segment connecting a pressure sensor under the right tiptoe and a pressure sensor under the left tiptoe. The orientation of the vector detected in this way can be represented by a ratio of a distance in an X direction and a distance in a Y direction.

In the example of FIG. 14, a coordinate of the midpoint of the line segment connecting the pressure sensor under the right heel and the pressure sensor under the left heel is P((x1+x3)/2, (y1+y3)/2). Moreover, a coordinate of the midpoint of the line segment connecting the pressure sensor under the right tiptoe and the pressure sensor under the left tiptoe is P((x2+x4)/2, (y2+y4)/2). When a coordinate of the pressure sensor located in the upper left of FIG. 14 is (1, 1), the coordinates of these midpoints are (4, 9) and (10, 3.5), respectively. Therefore, the distance in the X direction is 6, and the distance in the Y direction is 5.5.

Here, the orientation detection unit 233 detects a value which is produced by the division of the distance in the Y direction by the distance in the X direction (5.5/6=0.917) as angle information indicating an angle formed between the body orientation of the worker and the orientation of the working area of the action part seen from the worker. Here, in the case where an angle formed between the body orientation of the worker and the orientation of the working area of the action part seen from the worker is represented as θ, a value which is produced by the division of the distance in the Y direction by the distance in the X direction corresponds to tan θ. The orientation detection unit 233 outputs the detected angle information to the preparatory movement determination unit 203.

Figure 15:
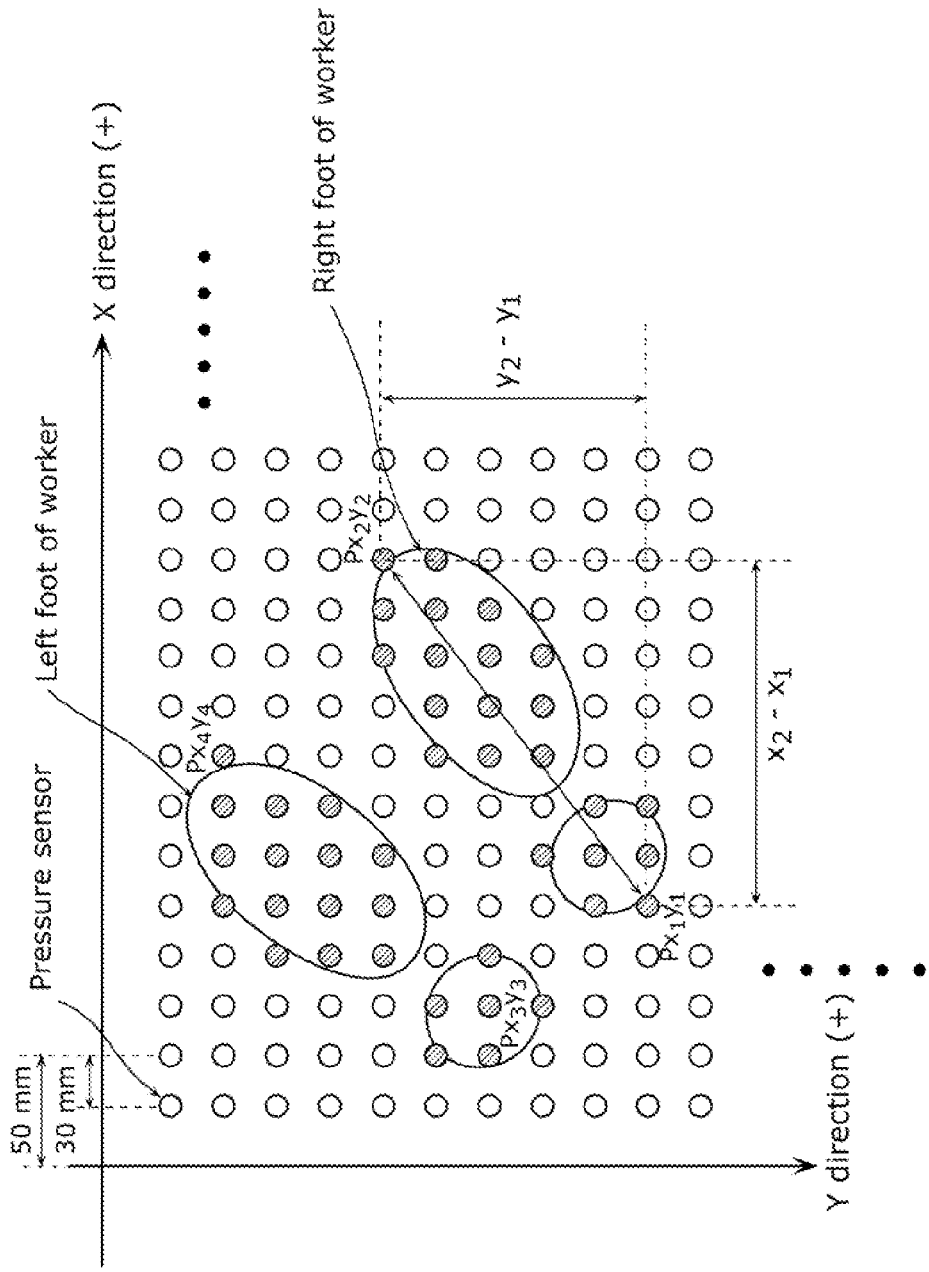
FIG. 15 is a diagram showing another example of the pressure sensor sheet according to Embodiment 2.

It should be noted that there is a case where the pressure distribution for each of the soles of feet measured by the pressure sensor sheet 311 is not only one area as shown in the example of FIG. 14 but also divided into a plurality of areas, depending on each of the shoe sole forms. For example, as shown in FIG. 15, the pressure distribution for each of the soles of feet is divided into two areas because between the heel side and the tiptoe side, there is an area to which no pressure is applied. In this case, the size detection unit 235 and the orientation detection unit 233 may extract, as a group of pressure sensors, a group of pressure sensors corresponding to the tiptoe and a group of pressure sensors corresponding to the heel by holding a plurality of kinds of pressure distributions and by performing a matching between a pressure distribution measured by the pressure sensor sheet 311 and each of the held pressure distribution patterns.

The preparatory movement definition storage unit 202 stores, in association with a plurality of distances between the working area of the action part and the worker, a plurality of pairs of the first threshold value and the second threshold value. Furthermore, the preparatory movement definition storage unit 202 stores, in association with a plurality of distances between the working area and the worker, a plurality of third threshold values regarding the body orientation.

For example, as shown in FIG. 16, the preparatory movement definition storage unit 202 stores, in association with the distance, the preparatory movement definition table 202a which includes the body orientation, the center-of-gravity moving speed in an X direction, a relative time in which an entry into the dangerous area is predicted, and an entry portion.

A preparatory movement ID001 of FIG. 16 indicates that the preparatory movement preceding the dangerous movement is being performed in the case where a distance between the machine press and the worker's feet is from 500 to 800 mm, a value which is produced by the division of the distance in the Y direction by the distance in the X direction is less than 0.26, and the center-of-gravity moving speed is from −10 to −5 mm/s. It should be noted that 0.26 which is the value produced by the division of the distance in the Y direction by the distance in the X direction corresponds to the fact that a body orientation of the worker with respect to the front face of the machine press is 15 degrees.

When such a condition is met, it is shown that the upper body of the worker enters the dangerous area 500 msec later. In this way, in the preparatory movement definition storage unit 202, information about the preparatory movement of the lower body preceding the dangerous movement which causes the upper body to enter the dangerous area is stored.

The preparatory movement determination unit 203 determines whether or not the preparatory movement preceding the dangerous movement is being performed by determining whether or not the condition indicated by the preparatory movement definition table 202a is met.

Specifically, the preparatory movement determination unit 203 identifies, with reference to the preparatory movement definition table 202a, a condition of the center-of-gravity moving speed and a body orientation that corresponds to a distance corrected by the correction unit 237. Specifically, the preparatory movement determination unit 203 identifies the range of the center-of-gravity moving speed (the first threshold value to the second threshold value) and the range of a body orientation that correspond to the corrected distance.

Then, the preparatory movement determination unit 203 determines whether or not the center-of-gravity moving speed obtained from the plurality of posture data is within the range of the specified center-of-gravity moving speed. Furthermore, the preparatory movement determination unit 203 determines whether or not the value indicating angle information detected by the orientation detection unit 233 is within the range of the specified body orientation.

Here, in the case where the center-of-gravity moving speed is within the range of the specified center-of-gravity moving speed and the value indicating angle information is within the range of the specified body orientation, the preparatory movement determination unit 203 determines that the preparatory movement preceding the dangerous movement is being performed.

Next, operations of the safety device 10 as configured the above will be described.

Figure 17:
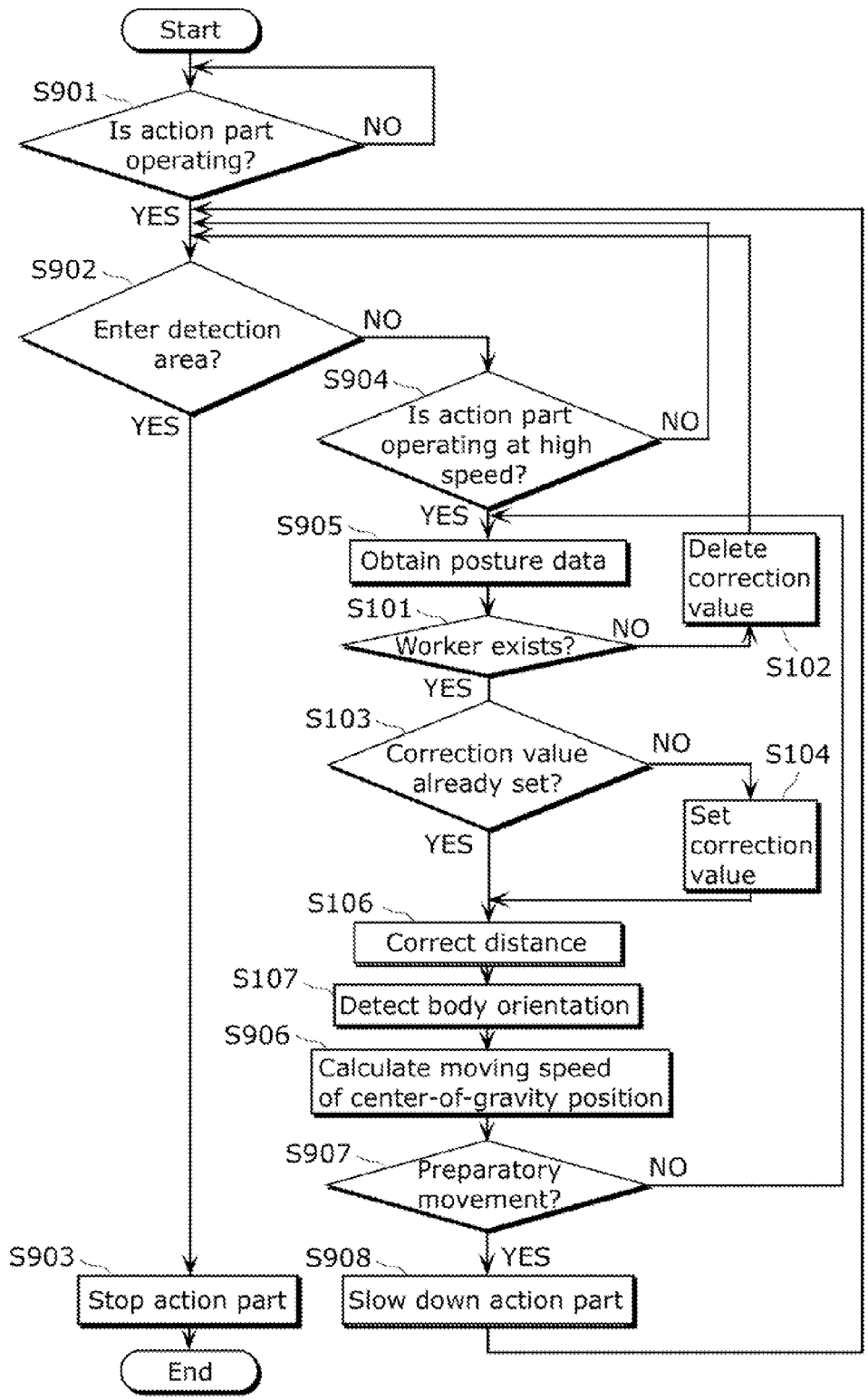
FIG. 17 is a flowchart showing operations of the safety device according to Embodiment 2.

FIG. 17 is a flowchart showing the operations of the safety device 10 according to Embodiment 2. The same steps as those in FIG. 11 are provided with the same signs and their descriptions will be omitted.

After the plurality of posture data including the pressure distribution of the soles of feet of the worker are obtained (S905), the size detection unit 235 determines whether or not there is a worker on the pressure sensor sheet 311 (S101). Specifically, the size detection unit 235, for example, determines whether or not there is a worker on the pressure sensor sheet 311 by determining whether or not the number of pressure sensors which measure positive pressure values is more than a constant number.

In the case where there is not a worker on the pressure sensor sheet 311 (NO in S101), the size detection unit 235 deletes the correction value stored in the correction value storage unit 236 (S102) and the flow returns to the process of Step S902.

In the case where there is a worker on the pressure sensor sheet 311 (YES in S101), the size detection unit 235 determines whether or not a correction value is stored in the correction value storage unit 236 (S103). Here, in the case where a correction value is not stored (NO in S103), the size detection unit 235 detects the size of the soles of feet of the worker by using the pressure distribution of the soles of feet of the worker included in the plurality of posture data, and stores, as a correction value, the ratio of the detected size to the standard size in the correction value storage unit 236 (S104). Meanwhile, in the case where a correction value is stored (YES in S103), the distance detection unit 234 detects a distance between the worker and the dangerous area. Then, the correction unit 237 corrects the detected distance with the use of the correction value stored in the correction value storage unit 236. (S106)

Furthermore, the orientation detection unit 233 detects the body orientation of the worker with respect to the front face of the machine press (S107). Then, the preparatory movement determination unit 203 calculates the moving speed of the center-of-gravity position of the worker (S906).

The preparatory movement determination unit 203 determines whether or not the preparatory movement is being performed by determining whether or not the body orientation of the worker and the center-of-gravity moving speed are within a range which is stored by the preparatory movement definition storage unit 202 and which corresponds to a distance after correction (S907).

As described above, the safety device 10 according to the present embodiment can determine whether or not the preparatory movement preceding the dangerous movement in which the worker enters the dangerous area is being performed, by using the body size of the worker and the body orientation of the worker. With this, the preparatory movement preceding the dangerous movement can be determined with high accuracy. Moreover, in the case where it is determined that the preparatory movement is being performed, the action part can be slowed down or stopped and the worker can be prevented from being injured.

Specifically, the safety device 10 can correct the distance between the working area of the action part and the worker such that when at least a size of part of the worker's body is larger, the distance is shorter. When the body size of the worker is larger, the possibility is higher that the body enters the working area of the action part even though the worker is at a position away from the working area of the action part. Therefore, by determining whether or not the preparatory movement preceding the dangerous movement is being performed based on a distance which is corrected according to the body size of the worker, it can be determined with higher accuracy the preparatory movement preceding the dangerous movement is being performed.

Moreover, the safety device 10 can determine whether or not the preparatory movement is being performed, based on the body orientation of the worker. When the orientation of the worker is toward the front face, the possibility is higher that the body enters the working area of the action part. Therefore, it is possible to determine with higher accuracy that the preparatory movement preceding the dangerous movement is being performed.

Moreover, the safety device 10 can determine whether or not the preparatory movement is being performed, based on the first threshold value and the second threshold value that correspond to the detected distance. The shift of the center-of-gravity position in an orientation away from the working area of the action part which is caused by the preparatory movement is varied by depending on the distance between the working area of the action part and the worker. For example, the moving distance of the center-of-gravity position is longer because when the distance between the working area of the action part and the worker is longer, the dangerous movement is a larger movement. Therefore, by determining whether or not the preparatory movement is being performed based on the first threshold value and the second threshold value that correspond to the detected distance, it is possible to determine with higher accuracy that the preparatory movement preceding the dangerous movement is being performed.

It should be noted that in Embodiments 1 and 2, the safety device 10 slows down or stops the action part 209 in the case where the preparatory movement is being performed, but does not necessarily have to slow down or stop the action part 209. For example, the safety device 10 may output a warning sound in the case where the preparatory movement is being performed. Moreover, the safety device 10 may turn on a warning lamp in the case where the preparatory movement is being performed.

Moreover, the safety device 10 may, after the detection of the preparatory movement, return a speed of the action part to a level during a normal operation in the case where entry detection is not performed by the infrared sensor 204 even after a predetermined entry time is passed. With this, a decrease in working efficiency caused by an erroneous determination of the preparatory movement can be prevented.

As described above, the safety device 10 according to an aspect of the present disclosure has been described based on the embodiments, but the present disclosure is not defined only by the embodiments. Various modifications conceived by those skilled in the art and applied to the present embodiments or embodiments structured by a combination of constituent elements in different embodiments are possible without materially departing from the novel teachings and advantages of this disclosure. Accordingly, all such modifications are intended to be included within the scope of the present disclosure.

For example, in Embodiments 1 and 2, the posture obtainment unit 201 obtains the plurality of posture data from the pressure sensor sheet, but does not necessarily have to obtain the plurality of posture data from the pressure sensor sheet. For example, the posture obtainment unit 201 may obtain the plurality of posture data from a posture detection device which includes one or more cameras and an image recognition system. In that case, the plurality of posture data are acceptable as long as the data include a three-dimensional model which indicates a body shape of the worker. Then, the preparatory movement determination unit 203 may calculate the center-of-gravity position of the lower body of the worker from the three-dimensional model, and may determine whether or not the preparatory movement is being performed, based on the moving speed of the center-of-gravity position and the like.

It should be noted that in Embodiments 1 and 2, a machine tool is a machine press which performs a press work by slides which perform an up-and-down reciprocating motion, but may be a rolling machine using a roller, a stationary power saw, a polishing machine, a sewing machine, or the like. A machine tool may be a machine as long as a machine requires the worker to be in contact with a work object on the machine tool, such as the case where there is need for replacement and position adjustment of a work object or for a support of a work object.

It should be noted that in Embodiments 1 and 2, the safety device is a safety device of a machine tool which performs a press work for a work object with the use of slides which perform an up-and-down reciprocating motion, but does not necessarily have to be a safety device of the machine tool which performs a work for the work object. For example, the safety device may be a safety device of a robot which moves the object.

The following will describe a safety device of a transportation robot which performs a shift of heavy goods (object). Here, in the work of transporting the heavy goods, the worker cooperates with the robot to transport the heavy goods.

Figure 18:
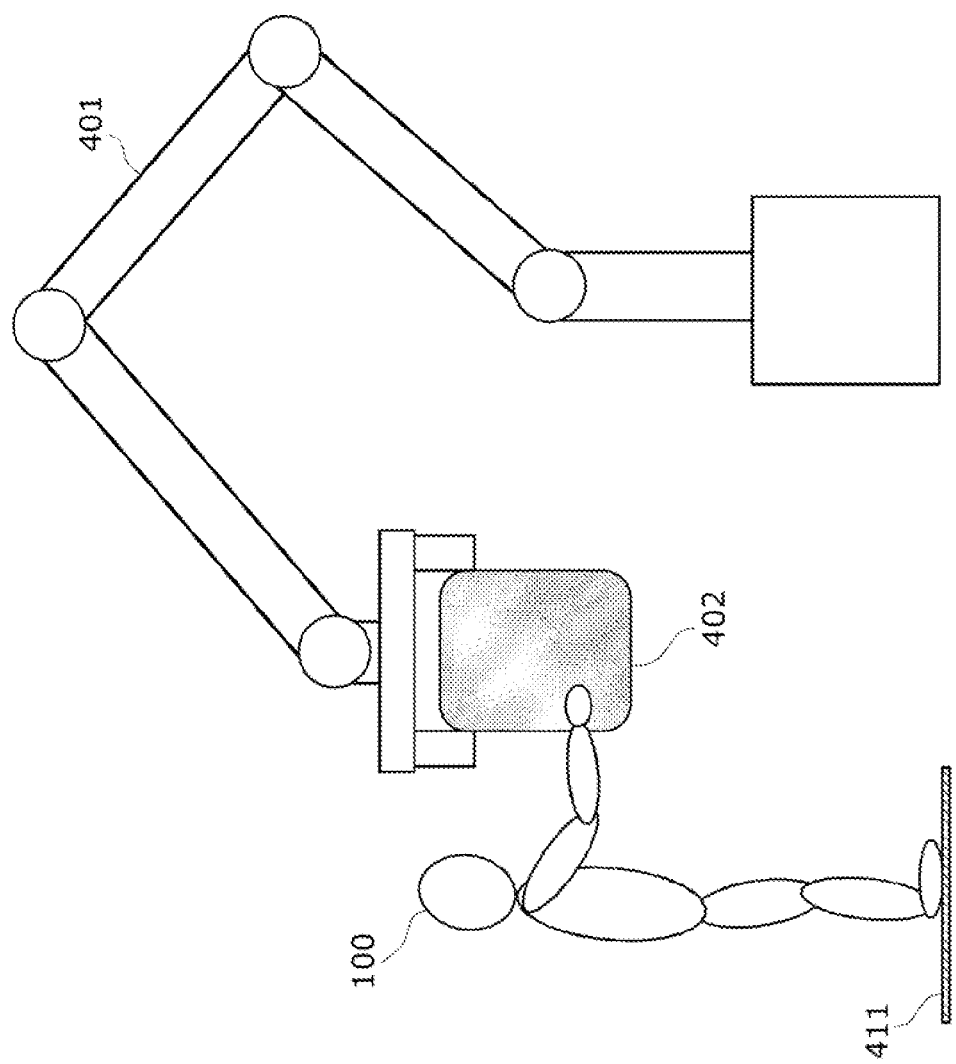
FIG. 18 is a diagram showing a scene in which a worker and a robot are carrying out cooperative transportation.

FIG. 18 is a diagram showing a scene in which the worker 100 and a robot 401 are carrying out cooperative transportation. In FIG. 18, the worker 100 cooperates with the robot 401 to transport heavy goods 402 by putting hands on the heavy goods 402 which is transported by an action part of the robot 401.

For example, in the case where a motor is incorporated into a chassis, the heavy goods 402 correspond to the motor. In this case, the worker 100 adjusts the position of the action part of the robot 401 or the motor held by the robot 401 by directly touching the action part of the robot 401 or the motor held by the robot 401 such that the worker 100 slightly adjusts the position or the orientation of the motor with respect to the non-illustrated chassis (heavy goods 402).

In the case where the worker 100 performs such a movement, there is a possibility that the body of the worker 100 (especially part of the upper body) collides with the action part of the robot 401 or the heavy goods 402 which is being transported. Therefore, the safety device detects, as similarly to the safety device according to Embodiment 1 or 2, for example, a change in the posture of the worker 100 with a pressure sensor sheet 411 installed on the floor surface of the working position of the worker 100 and the like. Then, the safety device determines whether or not the preparatory movement is performed in which the upper body of the worker 100 is entering a predetermined movable area of the robot 401.

In the case where it is determined that the preparatory movement of the dangerous movement is being performed, the safety device slows down the speed of the action part of the robot 401 to a speed in which the worker is not injured even in the case of a collision. Alternately, in the case where it is determined that the preparatory movement of the dangerous movement is being performed, the safety device may control the robot 401 such that an impact of a collision on the worker 100 is eased by a control of a suspension or a damper, or by a control of robot operational impedance.

It should be noted that Embodiments 1 and 2 describe a configuration in which the preparatory movement of the worker is detected with the pressure sensor sheet installed on the floor surface by assuming that the working posture of the worker is an erect position. However, in the case where the worker is using a work chair or a standing aid for work, the pressure sensor sheets are provided on the seating surface of the work chair and the body contact surface of the standing aid and it may be determined, from a change in the pressure distribution of the worker's buttock region and femoral region, whether or not the preparatory movement is being performed.

It should be noted that in Embodiments 1 and 2, the safety device 10 determines whether or not the preparatory movement is being performed, based on the shift of the center-of-gravity position of the pressure distribution of the soles of feet of the worker by the pressure sensor sheet installed on the floor surface, but does not necessarily have to determine the performance of the preparatory movement in this way. For example, the safety device 10 may determine whether or not the preparatory movement is being performed, based on a change in pressure applied to each of the areas of the front sides and the back sides with respect to the worker's plantar arches.

It should be noted that in Embodiments 1 and 2, the safety device 10 detects the distance between the worker and the dangerous area based on the positions of pressure sensors in which positive pressure values are measured, but may detect the distance based on the center-of-gravity position of the pressure distribution of the soles of feet.

It should be noted that in Embodiments 1 and 2, the pressure sensor sheet is installed on the floor surface, but may be installed in the shoe soles or in the inside bottom surfaces of the shoes. In that case, the distance between the dangerous area of the machine tool and the worker may be separately measured by a measurement means which measures a distance between two points, for example, an ultrasonic sensor, a camera, or the like.

It should be noted that in Embodiment 1, the safety device 10 does not include the distance detection unit 234, but may include the distance detection unit 234. In that case, the preparatory movement determination unit 203 may determine that the preparatory movement is being performed in the case where the center-of-gravity position is shifting in an orientation away from the working area of the action part and the distance detected by the distance detection unit 234 is less than the third threshold value. With this, the preparatory movement determination unit 203 can determine that the preparatory movement is being performed in the case where the distance between the working area of the action part and the worker is less than the third threshold value. In other words, since the possibility is low that the worker's body enters the working area of the action part in the case where the worker is at a position away from the working area of the action part, the preparatory movement determination unit 203 can determine that the preparatory movement preceding the dangerous movement is not being performed. In other words, the safety device 10 can slow down or stop the action part in the case where the possibility is low that the worker is injured, and therefore can enhance the workability.

Moreover, in Embodiments 1 and 2, the preparatory movement determination unit 203 determines whether or not the preparatory movement is being performed, based on the moving speed of the center-of-gravity position, but may determine whether the preparatory movement is being performed, based on the moving time or the moving distance of the center-of-gravity position.

Figure 19:
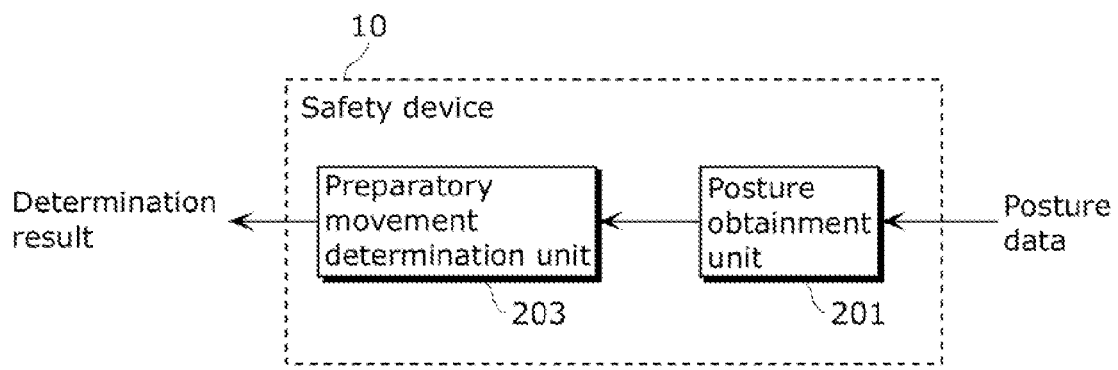
FIG. 19 is a block diagram showing a functional configuration of a safety device according to an aspect of the present disclosure.

Moreover, in Embodiments 1 and 2, the safety device 10 includes a plurality of constituent elements as shown in FIG. 4 or 13, but does not necessarily have to include all of the constituent elements. Specifically, the safety device 10, for example, as shown in FIG. 19, may be a device which includes the posture obtainment unit 201 and the preparatory movement determination unit 203. Even in this case, the safety device 10 can determine that the preparatory movement preceding the dangerous movement which brings the upper body of the worker closer to the working area of the action part is being performed, based on a change in the posture of the lower body of the worker. Therefore, the safety device 10 can detect with high accuracy that the dangerous movement is performed before the dangerous movement is performed. Furthermore, the safety device 10 can prevent the worker from being injured by outputting a determination result to the safety operation control unit 208 or the like.

Moreover, part or the whole of the constituent elements included in the safety device according to Embodiment 1 or 2 may be composed of one system Large Scale Integration (LSI). For example, the safety device 10 may be composed of a system LSI including the posture obtainment unit 201 and the preparatory movement determination unit 203.

The system LSI is a super-multi-function LSI which is manufactured by integrating constituent units on one chip, and is specifically a computer system which is configured by including a microprocessor, Read Only Memory (ROM), Random Access Memory (RAM), and the like. A computer program is stored in the RAM. The system LSI achieves its function through an operation of the microprocessor according to the computer program.

It should be noted that the name used here is system LSI, but may be called Integrated Circuit (IC), LSI, super LSI or ultra LSI, depending on a difference in the degree of integration. Moreover, the means for circuit integration is not limited to an LSI, and an implementation with a dedicated communication circuit or a general-purpose processor is also available. In addition, it is also acceptable to use a Field Programmable Gate Array (FPGA) that is programmable after the LSI has been manufactured, and a reconfigurable processor in which connections and settings of circuit cells within the LSI are reconfigurable.

Furthermore, if integrated circuit technology that replaces LSI appears through progress in semiconductor technology or other derived technology, that technology can naturally be used to carry out integration of the constituent elements. Application of biotechnology is one such possibility.

Moreover, an aspect of the present disclosure may be a preparatory movement determination method of designating the characteristic processing units included in the safety device as steps. Moreover, an aspect of the present disclosure may be also implemented as a computer program that causes the computer to execute each of the characteristic steps included in the preparatory movement determination method. Furthermore, an aspect of the present disclosure may be a computer-readable non-transitory medium having such a computer program recorded thereon.

It should be noted that in each of the embodiments, each of the constituent elements may be implemented by being composed of a dedicated hardware or by executing a software program that is suitable to each of the constituent elements. Each of the constituent elements may be implemented by having a program execution unit, such as Central Processing Unit (CPU) or a processor, read and execute a software program that is recorded on a storage medium such as a hard disk or a semiconductor memory. Here, the following software can implement an image decoding device or the like according to each of the embodiments.

In other words, the program causes a computer to execute the preparatory movement determination method for preventing the worker from being injured by a machine which includes an action part for processing or moving the work object. In other words, the program causes the computer to execute a posture obtainment step in which the plurality of posture data indicating a posture at least part of the lower body of the worker are obtained and a preparatory movement determination step in which in the case where a change in the posture indicated by the the plurality of posture data shows that the worker is shifting the center of gravity of whole body of the worker in an orientation away from the working area of the action part without moving the positions of both feet, it is determined that the preparatory movement preceding the dangerous movement which brings at least part of the upper body of the worker closer to the working area of the action part is being performed.

INDUSTRIAL APPLICABILITY

Exemplary devices and methods in the present disclosure and their equivalents within the scope of the inventive concept defined in the attached claims are effective as a safety device of a machine tool such as a machine press which performs a press work by slides which perform an up-and-down reciprocating motion, a rolling machine to using a roller, a stationary power saw, a polishing machine, a sewing machine, or the like.

The invention claimed is:

1. A preparatory movement determination method for preventing a worker from being injured by a machine having an action part for processing or moving an object, said preparatory movement determination method comprising:
   obtaining a plurality of posture data indicating a posture of at least a part of a lower body of the worker; and
   determining that a preparatory movement preceding a dangerous movement is being performed in the case where a change in the posture indicated by the plurality of posture data shows that the worker is shifting a center of gravity of whole body of the worker in an orientation away from a working area of the action part without moving positions of both feet, the dangerous movement being a movement of at least a part of an upper body of the worker approaching the working area of the action part.

2. The preparatory movement determination method according to claim 1,
   wherein the plurality of posture data include a pressure distribution of soles of feet of the worker, and
   in the determining, it is determined that the preparatory movement is being performed in the case where a position specified by the pressure distribution is moving in an orientation away from the working area.

3. The preparatory movement determination method according to claim 2, wherein the position specified by the pressure distribution is a center-of-gravity position of the pressure distribution.

4. The preparatory movement determination method according to claim 3,
wherein in the determining, it is determined that the preparatory movement is being performed in the case where the center-of-gravity position is shifting in an orientation away from the working area and a moving speed, a moving time, or a moving distance of the center-of-gravity position in the orientation away from the working area of the action part is greater than or equal to a first threshold value.

5. The preparatory movement determination method according to claim 4,
wherein in the determining, it is determined that the preparatory movement is being performed in the case where the center-of-gravity position is shifting in an orientation away from the working area and a moving speed, a moving time, or a moving distance of the center-of-gravity position in the orientation away from the working area of the action part is from greater than or equal to a first threshold value to less than a second threshold value.

6. The preparatory movement determination method according to claim 3, further comprising
detecting a distance between the working area and the worker,
wherein in the determining, it is determined that the preparatory movement is being performed in the case where the center-of-gravity position is shifting in an orientation away from the working area and the distance is less than a third threshold value.

7. The preparatory movement determination method according to claim 6, further comprising:
detecting a size of at least a part of the body of the worker; and
correcting the detected distance such that when the size of the at least a part of the body of the worker is larger, the distance is shorter,
wherein in the determining, it is determined that the preparatory movement is being performed in the case where the center-of-gravity position is shifting in the orientation away from the working area of the action part and the corrected distance is less than the third threshold value.

8. The preparatory movement determination method according to claim 3, further comprising
detecting a body orientation of the worker,
wherein in the determining, it is determined that the preparatory movement is being performed in the case where the center-of-gravity position is shifting in an orientation away from the working area of the action part and an angle formed between the body orientation of the worker and an orientation of the working area of the action part seen from the worker is within a predetermined range.

9. The preparatory movement determination method according to claim 2,
wherein in the obtaining, the plurality of posture data including the pressure distribution of the soles of feet of the worker are obtained from a pressure sensor installed on a floor surface.

10. The preparatory movement determination method according to claim 1, further comprising slowing down or stopping the action part in the case where it is determined that the preparatory movement is being performed.

11. A preparatory movement determination method using a safety device for preventing a worker from being injured by a machine having an action part for processing or moving an object, the safety device including a preparatory movement definition storage unit configured to store a first threshold value, the preparatory movement determination method comprising:
obtaining a plurality of posture data indicating a posture of at least a part of a lower body of the worker; and
determining that a preparatory movement preceding a dangerous movement is being performed in the case where a change in the posture indicated by the plurality of posture data shows that the worker is shifting a center of gravity of whole body of the worker in an orientation away from a working area of the action part without moving positions of both feet, the dangerous movement being a movement of at least a part of an upper body of the worker approaching the working area of the action part,
wherein the plurality of posture data include a pressure distribution of soles of the feet of the worker,
in the determining, it is determined that the preparatory movement is being performed in the case where a position specified by the pressure distribution is moving in an orientation away from the working area,
the position specified by the pressure distribution is a center-of-gravity position of the pressure distribution, and
in the determining, it is determined that the preparatory movement is being performed in the case where the center-of-gravity position is shifting in an orientation away from the working area and a moving speed, a moving time, or a moving distance of the center-of-gravity position in the orientation away from the working area of the action part is greater than or equal to the first threshold value stored in the preparatory movement definition storage unit.

12. The preparatory movement determination method according to claim 11, further comprising
detecting a distance between the working area and the worker,
wherein the preparatory movement definition storage unit is configured to store a plurality of first threshold values including the first threshold value in association with distances between the working of the action part area and the worker, and
in the determining:
a first threshold value corresponding to the detected distance is specified among the plurality of the first threshold values stored in the preparatory movement definition storage unit; and
it is determined that the preparatory movement is being performed in the case where the center-of-gravity position is shifting in an orientation away from the working area of the action part, and a moving speed, a moving time, or a moving distance of the center-of-gravity position in the orientation away from the working area of the action part is greater than or equal to the specified first threshold value.

13. The preparatory movement determination method according to claim 12, further comprising:
detecting a size of the soles of the feet of the worker, based on the pressure distribution; and correcting the detected distance such that when the size of the soles of the feet of the worker is larger, the distance is shorter,
wherein in the determining, the first threshold value corresponding to the corrected distance is specified among the plurality of the first threshold values.

\* \* \* \* \*